United States Patent
Floresta et al.

(10) Patent No.: US 11,309,737 B2
(45) Date of Patent: \*Apr. 19, 2022

(54) METHOD AND APPARATUS FOR POWER TRANSFER TO AN INDEPENDENT MOVING CART DURING TRAVEL ALONG A TRACK

(71) Applicant: Rockwell Automation Technologies, Inc., Mayfield Heights, OH (US)

(72) Inventors: John Floresta, Commack, NY (US); Peter Bruder, Smithtown, NY (US); Xikai Sun, Shanghai (CN); Peter M. Smit, Mount Sinai, NY (US); Oliver C. Haya, Milwaukee, WI (US); Mark R. Cooper, Eden Prairie, MN (US); Nanwei Yao, Edina, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/794,520

(22) Filed: Feb. 19, 2020

(65) Prior Publication Data
US 2020/0244105 A1   Jul. 30, 2020

Related U.S. Application Data

(63) Continuation of application No. 15/719,021, filed on Sep. 28, 2017, now Pat. No. 10,608,469.

(51) Int. Cl.
*H02P 27/06* (2006.01)
*H02J 50/10* (2016.01)
(Continued)

(52) U.S. Cl.
CPC .............. *H02J 50/10* (2016.02); *B60L 5/005* (2013.01); *B60L 15/007* (2013.01); *H01F 38/14* (2013.01);
(Continued)

(58) Field of Classification Search
CPC .. H02J 50/10; H02J 50/40; H02J 50/30; H02J 7/0068; H02P 25/064; H02P 27/06;
(Continued)

(56) References Cited

U.S. PATENT DOCUMENTS

| 3,659,168 A | 4/1972 | Salihi et al. |
| 4,427,910 A | 1/1984 | Richter et al. |

(Continued)

FOREIGN PATENT DOCUMENTS

| EP | 2806547 A1 | 11/2014 |
| EP | 3151397 | 4/2017 |

(Continued)

OTHER PUBLICATIONS

Extended European Search Report dated Sep. 23, 2020; Application No. / Patent No. 20182346.5-1202—(9) pages.
(Continued)

*Primary Examiner* — Rina I Duda
(74) *Attorney, Agent, or Firm* — Boyle Fredrickson, SC

(57) ABSTRACT

A system and method for providing power to independent movers traveling along a track in a motion control system without requiring a fixed connection between the mover and a power source external to the mover. In one embodiment, a sliding transformer transfers power between the track and each mover. In another embodiment, an optical transmitter transfers power between the track and an optical receiver mounted on each mover. In yet another embodiment, a generator includes a drive wheel engaging the track as each mover travels along the track. A power converter on the mover receives the power generated on and/or transmitted to the mover to control an actuator or a sensor mounted on the mover or to activate drive coils mounted on the mover to interact with magnets mounted along the track and, thereby, control motion of each mover.

18 Claims, 18 Drawing Sheets

(51) Int. Cl.
| | |
|---|---|
| *B60L 15/00* | (2006.01) |
| *H01F 38/14* | (2006.01) |
| *H02J 50/30* | (2016.01) |
| *B60L 5/00* | (2006.01) |
| *H02P 25/064* | (2016.01) |
| *H02J 50/40* | (2016.01) |
| *H02J 7/00* | (2006.01) |
| *H02K 7/18* | (2006.01) |
| *H02K 41/03* | (2006.01) |
| *H02P 6/04* | (2016.01) |
| *B65G 54/02* | (2006.01) |

(52) U.S. Cl.
CPC .......... *H02J 7/0068* (2013.01); *H02J 50/30* (2016.02); *H02J 50/40* (2016.02); *H02K 7/1846* (2013.01); *H02K 41/031* (2013.01); *H02P 6/04* (2013.01); *H02P 25/064* (2016.02); *H02P 27/06* (2013.01); *B65G 54/02* (2013.01)

(58) Field of Classification Search
CPC .. H02K 7/1846; H02K 41/031; B60L 15/007; B60L 5/005; H01F 38/14; B65G 54/02
See application file for complete search history.

(56) References Cited

U.S. PATENT DOCUMENTS

| | | | |
|---|---|---|---|
| 5,013,929 A | 5/1991 | Dhyanchand | |
| 5,072,493 A * | 12/1991 | Hommes | B29C 55/20 26/72 |
| 5,293,308 A | 3/1994 | Boys et al. | |
| 5,341,280 A * | 8/1994 | Divan | H02J 50/005 363/37 |
| 5,433,311 A | 7/1995 | Bonnet | |
| 5,690,209 A * | 11/1997 | Kofoed | B65G 17/345 198/370.03 |
| 5,737,211 A | 4/1998 | Hirai et al. | |
| 5,927,657 A | 7/1999 | Takasan et al. | |
| 6,191,507 B1 | 2/2001 | Peltier et al. | |
| 6,515,878 B1 | 2/2003 | Meins et al. | |
| 6,522,035 B1 | 2/2003 | Smit | |
| 6,844,651 B1 | 1/2005 | Swift et al. | |
| 6,876,107 B2 | 4/2005 | Jacobs | |
| 7,109,610 B2 | 9/2006 | Tamai | |
| 7,559,282 B2 | 7/2009 | Austin | |
| 7,696,651 B2 | 4/2010 | Miyamoto | |
| 7,786,685 B2 * | 8/2010 | Schueren | H02K 41/031 318/135 |
| 8,384,251 B2 | 2/2013 | Shikayama et al. | |
| 8,776,694 B2 * | 7/2014 | Rosenwinkel | B65G 47/96 104/88.02 |
| 8,844,250 B2 | 9/2014 | Nemkov et al. | |
| 9,102,336 B2 | 8/2015 | Rosenwinkel | |
| 9,333,875 B2 | 5/2016 | Staunton et al. | |
| 9,422,121 B2 | 8/2016 | Staunton et al. | |
| 10,608,469 B2 * | 3/2020 | Floresta | B60L 5/005 |
| 2003/0201862 A1 * | 10/2003 | Arntz | B60L 5/005 336/174 |
| 2003/0230941 A1 * | 12/2003 | Jacobs | B29C 66/1122 310/12.19 |
| 2004/0227412 A1 | 11/2004 | Tamai | |
| 2009/0045773 A1 | 2/2009 | Pandya et al. | |
| 2009/0212728 A1 | 8/2009 | Yagi et al. | |
| 2009/0303749 A1 | 12/2009 | Boys et al. | |
| 2010/0130096 A1 | 5/2010 | Baarman et al. | |
| 2010/0231163 A1 | 9/2010 | Mashinsky | |
| 2010/0276256 A1 | 11/2010 | Kleinikkink et al. | |
| 2011/0043053 A1 | 2/2011 | Shikayama et al. | |
| 2011/0253495 A1 | 10/2011 | Vollenwyder et al. | |
| 2012/0055751 A1 | 3/2012 | Vollenwyder et al. | |
| 2012/0145500 A1 | 6/2012 | Staunton et al. | |
| 2012/0146425 A1 | 6/2012 | Lee et al. | |
| 2012/0247925 A1 | 10/2012 | Cooke | |
| 2013/0019773 A1 | 1/2013 | Rosenwinkel et al. | |
| 2014/0265645 A1 | 9/2014 | Jacobs et al. | |
| 2014/0285034 A1 * | 9/2014 | Krop | H02K 41/031 310/12.18 |
| 2014/0331888 A1 * | 11/2014 | Wernersbach | B60L 13/04 104/282 |
| 2015/0048693 A1 | 2/2015 | Prussmeier | |
| 2015/0244176 A1 | 8/2015 | Van Den Brink et al. | |
| 2015/0344233 A1 * | 12/2015 | Kleinikkink | B65G 43/10 700/230 |
| 2015/0364944 A1 | 12/2015 | Garcia Briz et al. | |
| 2016/0090275 A1 * | 3/2016 | Piech | H02J 5/005 187/250 |
| 2016/0152141 A1 | 6/2016 | Ragazzini | |
| 2016/0294227 A1 | 10/2016 | Podkamien et al. | |
| 2016/0339785 A1 | 11/2016 | Rumbak | |
| 2016/0352147 A1 | 12/2016 | Von Novak, III et al. | |
| 2016/0381829 A1 | 12/2016 | Niizuma et al. | |
| 2017/0043672 A1 | 2/2017 | Araki et al. | |
| 2017/0081135 A1 | 3/2017 | Wernersbach et al. | |
| 2017/0183170 A1 | 6/2017 | Wernersbach et al. | |
| 2017/0194092 A1 | 7/2017 | Vix | |
| 2018/0109144 A1 | 4/2018 | Moffatt et al. | |
| 2018/0248460 A1 | 8/2018 | Borghi et al. | |

FOREIGN PATENT DOCUMENTS

| | | |
|---|---|---|
| GB | 2463692 A | 3/2010 |
| WO | 99/08359 A1 | 2/1999 |
| WO | 2010/129369 A2 | 11/2010 |
| WO | 2012/138949 A2 | 11/2012 |
| WO | 2016/206757 A1 | 12/2016 |

OTHER PUBLICATIONS

Barnard et al.; Sliding Transformers for Linear Contactless Power Delivery; IEEE Transactions on Industrial Electronics, vol. 44, No. 6, Dec. 1997—(6) pages.
Klontz et al.; Contactless Power Delivery System for Mining Applications; IEEE Transactions on Industry Applications, vol. 31, No. 1 Jan./Feb. 1995—(9) pages.
Rockwell Automation: "Introducing ITRAK: The Intelligent Track System"; YouTube.com—(1) page, Published May 20, 2015.
Rockwell Automation: "User Manual—iTRAK System"; Bulletin 2198T; Jun. 30, 2017, XP055511206, Retrieved from the Internet: URL:https://literature.rockwellautomation.com/idc/graups/literature/documents/um/2198t-um001_-en-p.pdf—(138) pages.
Partial European Search Report dated Jan. 7, 2019—(13) pages.
European Patent Examination Communication Report dated May 26, 2021; Application No. 18 190 180.2-1202—(4) pages.
European Examination Communication pursuant to Article 94(3) EPC; Application No. EP18190180.2 dated Feb. 11, 2022—(4) pages.

* cited by examiner

METHOD AND APPARATUS FOR POWER TRANSFER TO AN INDEPENDENT MOVING CART DURING TRAVEL ALONG A TRACK

CROSS-REFERENCE TO RELATED APPLICATIONS

This application is a continuation of and claims priority to U.S. application Ser. No. 15/719,021, filed Sep. 28, 2017, the entire contents of which is incorporated herein by reference.

BACKGROUND INFORMATION

The present invention relates to motion control systems and, more specifically, to power transfer to an independent mover as it travels along a track in a motion control system incorporating multiple movers propelled along the track using a linear drive system.

Motion control systems utilizing movers and linear motors can be used in a wide variety of processes (e.g. packaging, manufacturing, and machining) and can provide an advantage over conventional conveyor belt systems with enhanced flexibility, extremely high speed movement, and mechanical simplicity. The motion control system includes a set of independently controlled "movers" each supported on a track for motion along the track. The track is made up of a number of track segments, and a linear drive system controls operation of the movers, causing the movers to travel along the track. Sensors may be spaced at fixed positions along the track and/or on the movers to provide information about the position and speed of the movers.

Each of the movers may be independently moved and positioned along the track in response to an electromagnetic field generated by the linear drive system. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

In certain applications, it may be desirable to provide an actuator or a sensor on the mover to interact with the product on the mover. For example, a clamp may actuate to secure the product to the mover or a sensor may detect the presence of the product on the mover. However, the actuator or sensor requires an energy source to operate. For electric actuators or sensors, the energy source may be a battery. For a hydraulic or pneumatic actuator, the energy source may be a pressurized tank. The energy source adds weight and takes up space on the mover. Further, the energy source needs to be periodically recharged.

One solution for providing energy to a mover is to provide a dedicated location along the track at which the energy is supplied. The mover stops at the dedicated location where a temporary connection to an energy source may be established. A first actuator external to the mover may engage the mover and establish an electrical, pneumatic, or hydraulic connection to the mover. A second actuator on the mover may perform the desired task, and the first actuator supplying power may subsequently disengage from the mover. This process, however, requires the mover to come to a stop at the dedicated location, wait for power to be connected, perform the desired action, and wait for the power to be disconnected before resuming motion. The additional steps required to supply power reduce the throughput of the system and the dedicated locations limit the ability of actuators or sensors present on a mover to operate.

Thus, it would be desirable to provide an improved system for supplying power to independent movers on a track in a motion control system.

Another solution for providing energy to a mover is to provide a fixed connection to the mover. The fixed connection may be, for example, an electrical conductor or a hydraulic or pneumatic hose. A fixed connection, however, is not without certain drawbacks. The motion of the mover is typically restricted to limit the required length of the electrical conductor or hose. The number of movers must be limited and/or the motion of the mover is limited to a reciprocal motion to avoid tangling the conductors or hoses between movers.

Thus, it would be desirable to provide a method and apparatus for transmitting power to an independent mover as in travels along a track in a motion control system which eliminates a fixed connection between the mover and a power source.

Historically, the linear drive system has included multiple coils spaced along the track and magnets mounted to each of the movers. The magnets on the movers may include multiple magnet segments with alternating north and south poles oriented to face the track. Each pair of north and south poles corresponds to a pole pair in the linear drive system. The coils along the track are sequentially energized with an alternating current which establishes an electromagnetic field around the coil. The electromagnetic field interacts with the magnetic field generated by the pole pairs on the movers and is controlled to drive the movers along the track. This arrangement, however, requires power converters corresponding to the coils spaced along the track to control the current through each coil. The linear drive system may require twice as many power converters as movers present on the track and include a significant portion of idle time while no mover is present over a coil controlled by the power converter.

Thus, it would be desirable to provide a system for transmitting sufficient power to each mover to supply power to coils on the mover which, in turn, interact with magnets mounted along the track to control operation of each mover.

BRIEF DESCRIPTION

The subject matter disclosed herein describes a system and method for providing power to independent movers traveling along a track without requiring a fixed or removable connection to each mover. A power converter on the mover may regulate the power supplied to the mover to control an electrical device, such as an actuator or a sensor mounted on the mover. The power converter on the mover may also be configured to activate drive coils mounted on the mover to interact with magnets mounted along the track and, thereby, control motion of each mover. In one embodiment, a sliding transformer transfers power between the track and each mover. In another embodiment, an optical transmitter transfers power between the track and an optical receiver mounted on each mover. In yet another embodiment, a generator includes a drive wheel engaging the track as each mover travels along the track. A power converter on the mover receives the power generated on and/or transmitted to the mover to control an actuator or a sensor mounted on the mover or to activate drive coils mounted on the mover to interact with magnets mounted along the track and, thereby, control motion of each mover.

In one embodiment of the invention an apparatus for providing power to a mover in a motion control system includes multiple movers, multiple electrical devices, and a closed track. Each electrical device is mounted to one of the movers, and the closed track defining a continuous path along which each of the movers travels. Each of the movers includes a drive wheel configured to engage the closed track and to rotate as the mover travels along the closed track, a drive shaft operatively coupled to the drive wheel wherein rotation of the drive wheel causes rotation of the drive shaft, and a generator operatively coupled to the drive shaft to generate electrical power when the drive shaft rotates. The apparatus also includes a power converter having an input and an output, where the input of the power converter receives the electrical power from the generator and the output supplies power to the at least one electrical device mounted on the mover.

According to another embodiment of the invention, an apparatus for providing power to a mover in a motion control system includes a plurality of movers a plurality of electrical devices, and a closed track. At least one of the electrical devices is mounted to each of the movers, and the closed track defining a continuous path along which each of the movers travels. The apparatus also includes an optical transmitter mounted on the closed track and operative to emit light at a predefined frequency, and a plurality of optical receivers. Each optical receiver is mounted to one of the movers and is oriented to receive the light emitted by the optical transmitter as the mover travels along the closed track. A plurality of power converters are included, where each of the plurality of power converters is mounted to one of the movers and is operative to receive power from the optical receiver and to supply power to the at least one electrical device mounted on the mover.

According to yet another embodiment of the invention, an apparatus for providing power to a mover in a motion control system includes a plurality of movers, a plurality of electrical devices, and a closed track. At least one of the electrical devices is mounted to each of the plurality of movers and the closed track defines a continuous path along which each of the plurality of movers travels. A primary winding is mounted along the closed track, where the primary winding is configured to receive power from a power supply. The apparatus further includes a plurality of secondary windings and a plurality of power converters. Each secondary winding is mounted to one of the plurality of movers and is generally aligned with the primary winding as the mover travels along the closed track. An air gap separates each secondary winding from the primary winding. Each of the plurality of power converters is mounted to one of the plurality of movers and is operative to receive power from the secondary winding mounted to the mover and to supply power to the at least one electrical device mounted on the mover.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
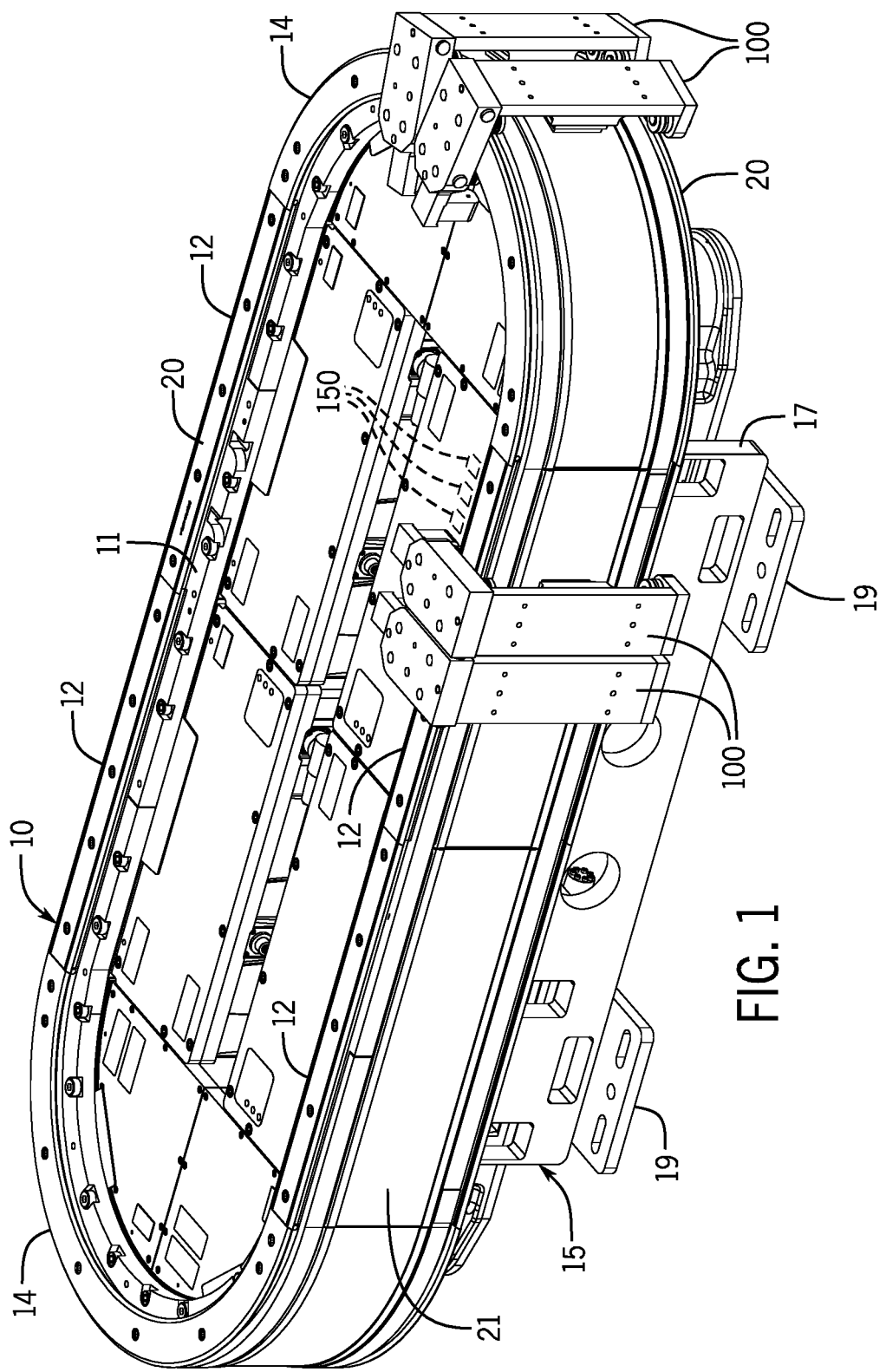
FIG. 1 is an isometric view of an exemplary transport system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary transport system for moving articles or products includes a track 10 made up of multiple segments 12, 14. According to the illustrated embodiment, the segments define a generally closed loop supporting a set of movers 100 movable along the track 10. The track 10 is oriented in a horizontal plane and supported above the ground by a base 15 extending vertically downward from the track 10. According to the illustrated embodiment, the base 15 includes a pair of generally planar support plates 17, located on opposite sides of the track 10, with mounting feet 19 on each support plate 17 to secure the track 10 to a surface. The illustrated track 10 includes four straight segments 12, with two straight segments 12 located along each side of the track and spaced apart from the other pair. The track 10 also includes four curved segments 14 where a pair of curved segments 14 is located at each end of the track 10 to connect the pairs of straight segments 12. The four straight segments 12 and the four curved segments 14 form a generally oval track and define a closed surface over which each of the movers 100 may travel. It is understood that track segments of various sizes, lengths, and shapes may be connected together to form a track 10 without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12, 14 is shown in a generally horizontal orientation. The track segments 12, 14 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiment, rails 20 extend generally along the outer periphery of the track 10. A first rail 20 extends along an upper surface 11 of each segment and a second rail 20 extends along a lower surface 13 of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the width of the track 10 and span only a partial width of the surface of the track 10 on which it is attached. According to the illustrated embodiment, each rail 20 includes a base portion 22 mounted to the track segment and a track portion 24 along which the mover 100 runs. Each mover 100 includes complementary rollers 110 to engage the track portion 24 of the rail 20 for movement along the track 10.

Figure 3:
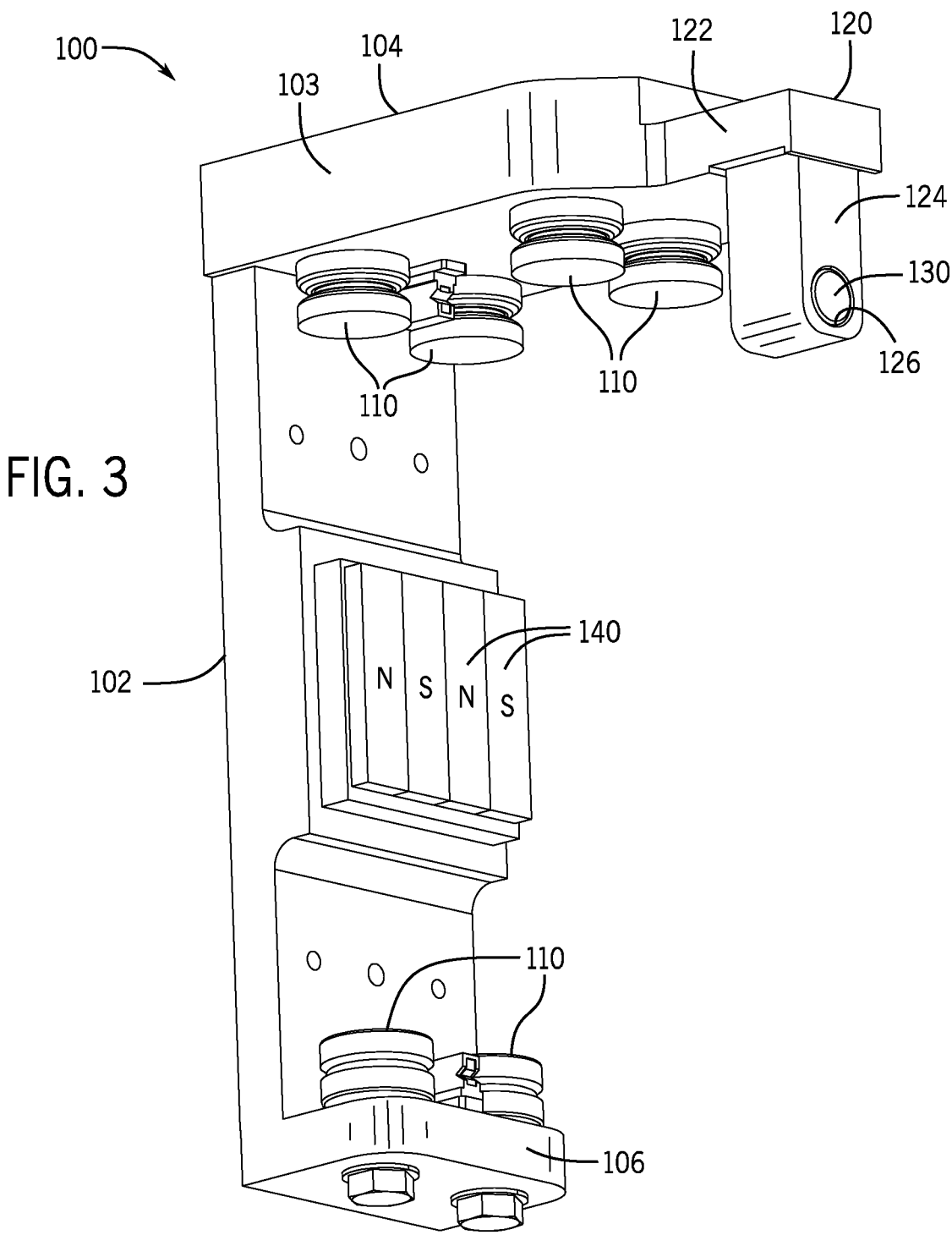
FIG. 3 is an isometric view of a mover from the transport system of FIG. 2.

One or more movers 100 are mounted to and movable along the rails 20 on the track 10. With reference next to FIG. 3, an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment.

Figure 2:
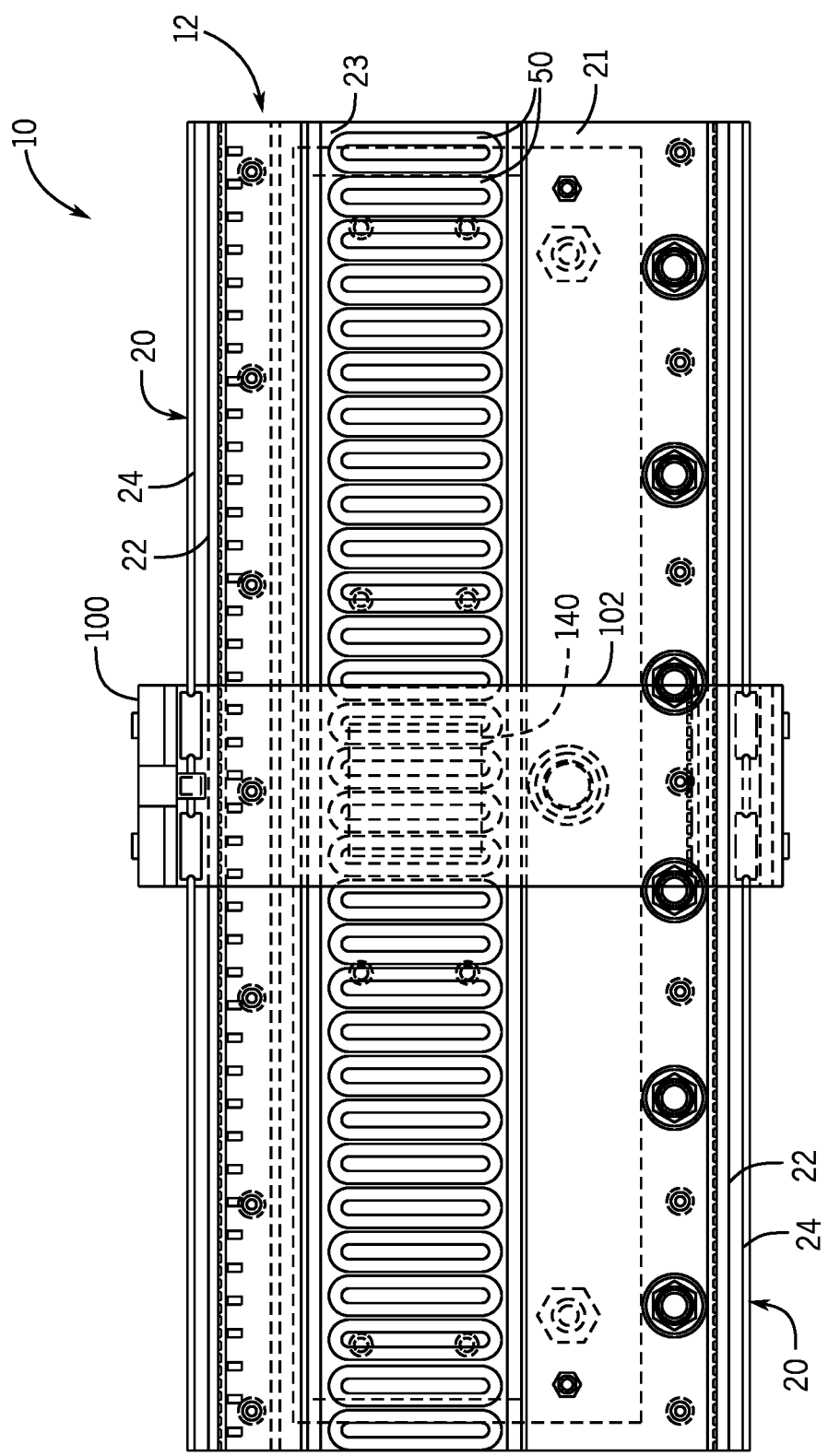
FIG. 2 is a partial side elevation view of one segment of one embodiment of the transport system of FIG. 1 illustrating activation coils distributed along one surface of the track segment.
Figure 4:
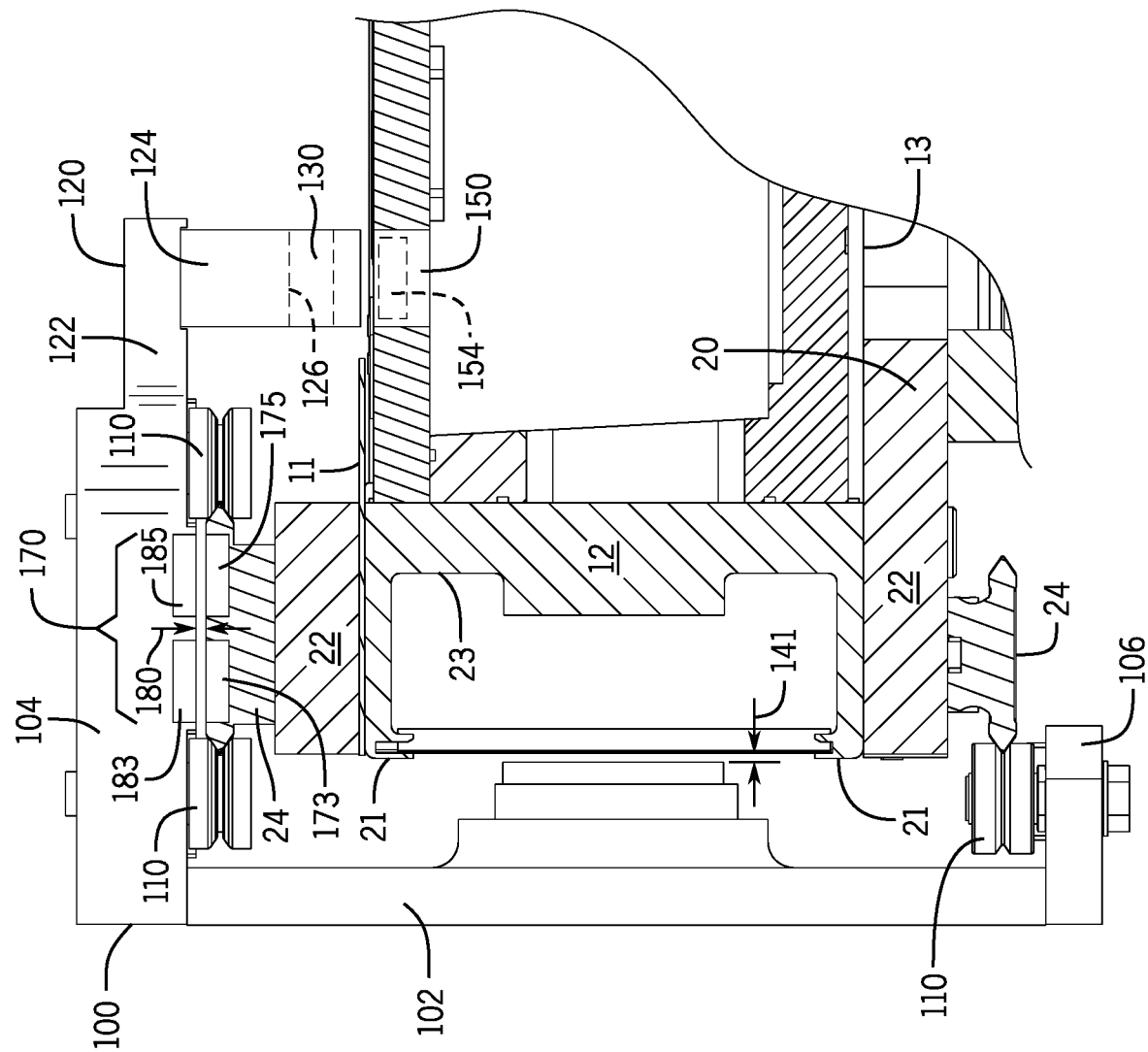
FIG. 4 is a partial sectional view of the transport system of FIG. 1.

A linear drive system is incorporated in part on each mover 100 and in part within each track segment 12, 14 to control motion of each mover 100 along the segment. According to one embodiment of the invention shown in FIG. 2, the linear drive system includes drive magnets 140 mounted to the side member 102. According to the illustrated embodiment, the drive magnets 140 are arranged in a block along an inner surface of the side member 102 with separate magnet segments alternately having a north pole, N, and south pole, S, pole facing the track segment 12. The drive magnets 140 are typically permanent magnets, and two adjacent magnet segments including a north pole and a south pole may be considered a pole-pair. The drive magnets 140 are mounted on the inner surface of the side member 102 and when mounted to the track 10 are spaced apart from a series of coils 50 extending along the track 10. As shown in FIG. 4, an air gap 141 is provided between each set of drive magnets 140 and the coils 50 along the track 10. On the track 10, the linear drive system includes a series of parallel coils 50 spaced along each track segment 12 as shown in FIG. 2. According to the illustrated embodiment, each coil 50 is placed in a channel 23 extending longitudinally along one surface of the track segment 12. The electromagnetic field generated by each coil 50 spans the air gap 141 and interacts with the drive magnets 140 mounted to the mover 100 to control operation of the mover 100.

Figure 11:
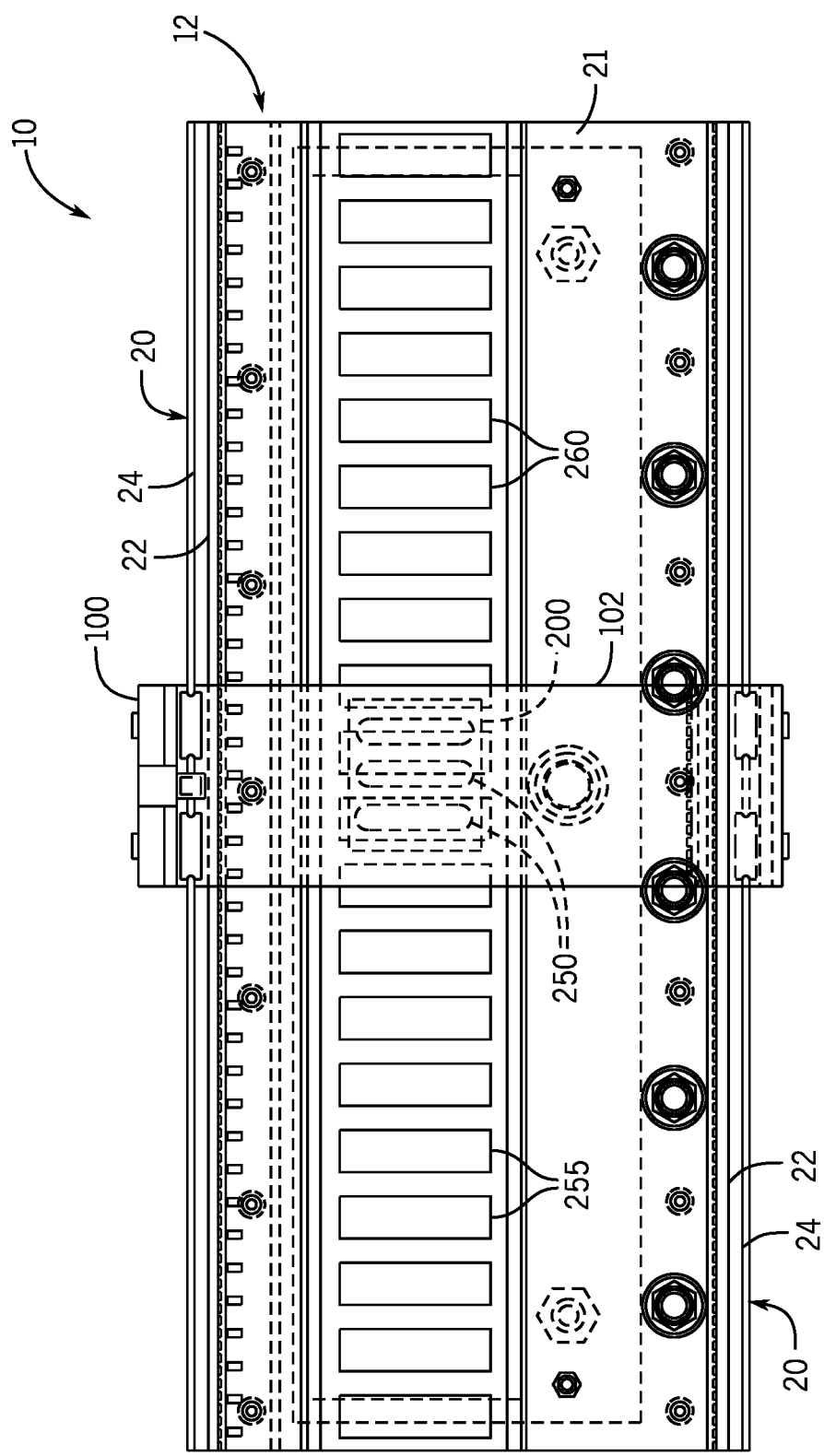
FIG. 11 is a partial side elevation view of one segment of another embodiment of the transport system of FIG. 1 illustrating driving magnets distributed along one surface of the track segment.
Figure 12:
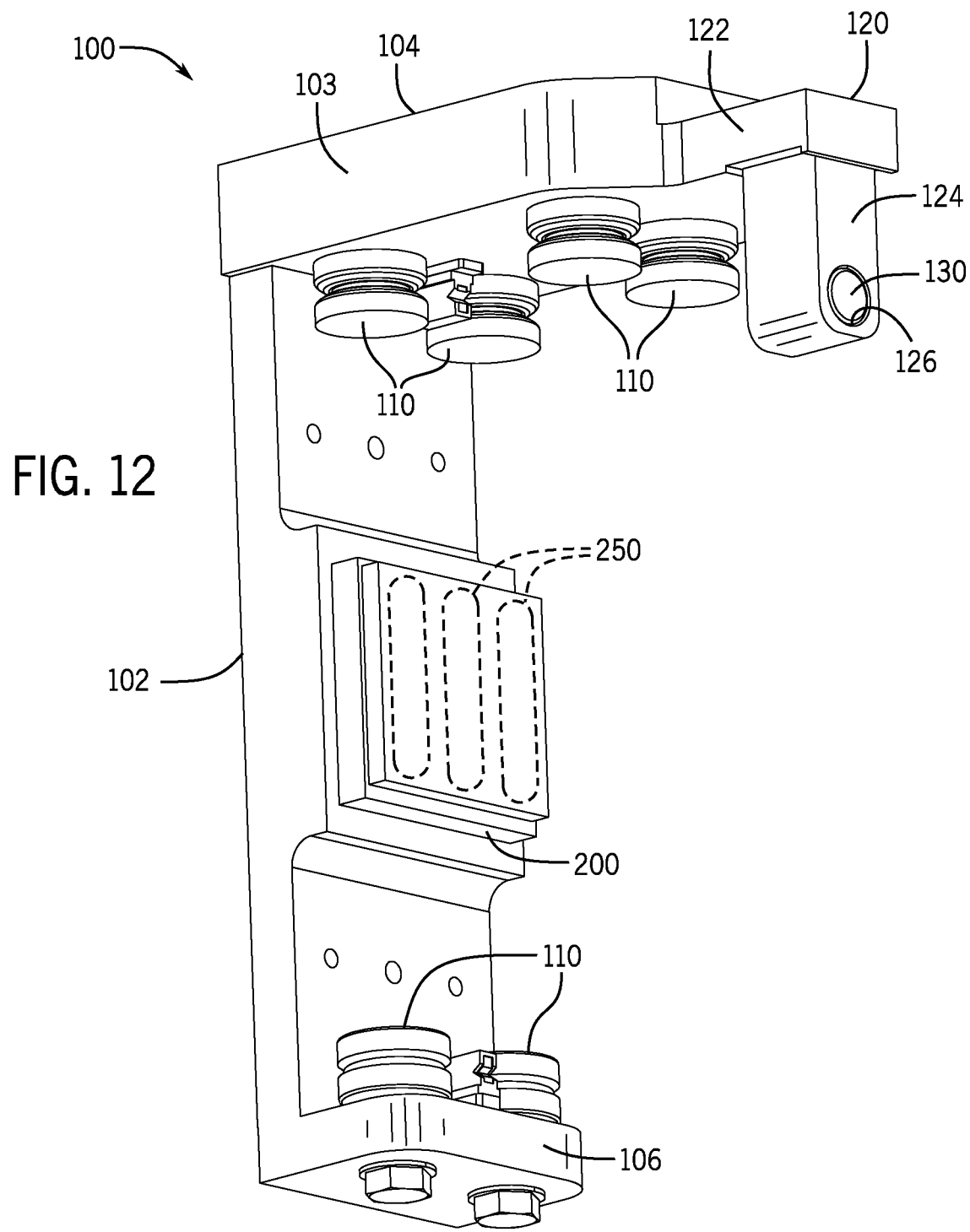
FIG. 12 is an isometric view of a mover from the transport system of FIG. 11.
Figure 13:
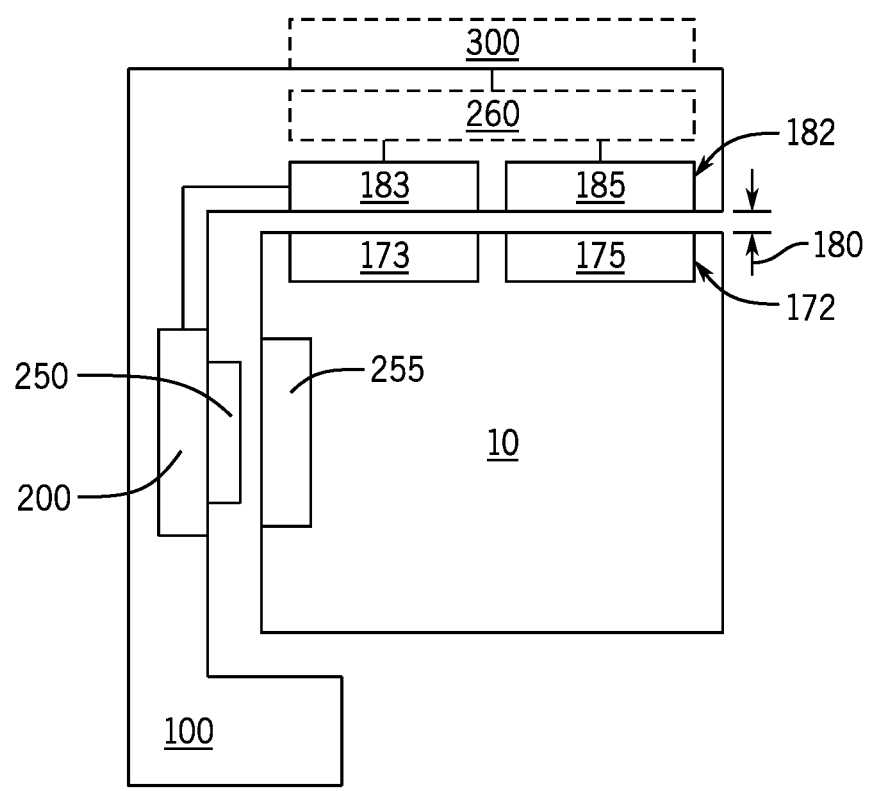
FIG. 13 is a block diagram representation of the mover illustrated in FIG. 12.

According to another embodiment of the invention shown in FIGS. 11-12, the linear drive system includes drive magnets 255 mounted along the track. With reference also to FIG. 4, the drive magnets 255 may be mounted in the channel 23 extending longitudinally along one surface of the track segment 12. A set of drive coils 250 is mounted to each mover 100. The drive coils 250 are mounted to the side member 102 and spaced apart from the drive magnets 255 such that an air gap 141 is defined between each set of drive coils 250 and the drive magnets 255 along the track. The drive magnets 255 are preferably arranged with consecutive magnet segments alternately having a north pole, N, and south pole, S, pole facing the mover 100. The mover 100 further includes a motor drive 200 mounted to the side member 102 and, as illustrated, is positioned between the side member 102 and the drive coils 250. As will be discussed in more detail below, the motor drive 200 receives power from a power source located off the mover 100 and delivers the power to the drive coils 250. The motor drive 200 controls the voltage and/or current provided to each drive coil 250 such that an electromagnetic field generated by each drive coil 250 on the mover 100 interacts with the drive magnets 255 mounted along the track 10 to control motion of the mover 100 along the track. Mounting the motor drive 200 along the side member 102 allows the side member to serve as a heat sink for the motor drive 200. However, it is contemplated that the motor drive 200 may be mounted in other locations on the mover 100 without deviating from the scope of the invention.

According to one embodiment of the invention, a sliding transformer is provided to transfer power between the track and each mover. The sliding transformer includes a primary winding extending along the track and a secondary winding mounted to each mover. The primary winding may be a single coil or multiple coils. If formed as a single coil, the primary winding may include a pair of bus bars extending along the track where one bus bar defines a forward conduction path and the other bus bar defines a return conduction path. If the primary winding is formed of multiple coils, a conductor may be wound along the track in the direction of travel to define the forward and reverse conduction paths or, optionally, multiple traces on a printed circuit board may be formed. It is contemplated that the primary winding may be formed of a number of closed loops extending along a portion of the track. The track, for example, may include multiple track segments and a single primary winding may extend along the surface of each track segment. The secondary winding may similarly be a single coil or multiple coils. If formed as a single coil, the secondary winding may include a pair of bus bars extending along the mover in the direction of travel where one bus bar defines a forward conduction path and the other bus bar defines a return conduction path. If the secondary winding is formed of multiple coils, a conductor may be wound along the mover in the direction of travel to define the forward and reverse conduction paths or, optionally, multiple traces on a printed circuit board may be formed. Each mover includes a single secondary winding and multiple movers travel along the track. The primary and secondary windings are generally aligned with each other and extend along the track and along the mover in the direction of travel with an air gap present between the windings.

Figure 5:
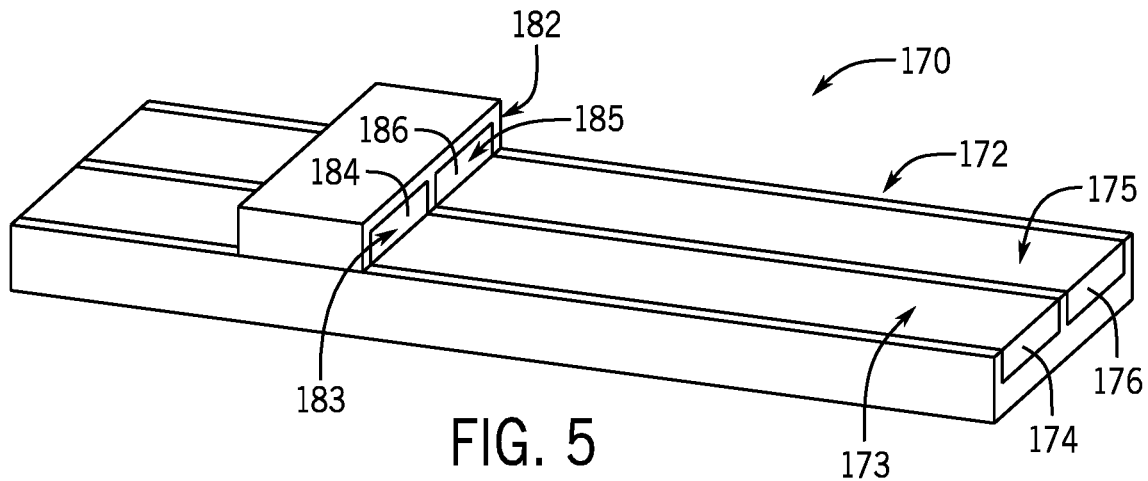
FIG. 5 is an exemplary schematic representation of a sliding transformer incorporated into the transport system of FIG. 4.

Turning to FIGS. 4 and 5, a sliding transformer 170 providing power to the mover 100 from a power source located off the mover is illustrated. The sliding transformer 170 provides wireless power transfer between the track 10 and a mover 100. According to the illustrated embodiment, a primary winding 172 is provided on the track 10 and a secondary winding 182 is provided on the mover 100. The primary winding 172 includes a forward conduction path 173 and a reverse conduction path 175 extending longitudinally along the track 10. According to one embodiment of the invention, the forward and reverse conduction paths 173, 175 may span multiple track segments 12, 14. An electrical connector may be provided between track segments 12, 14 to establish a continuous electrical connection between segments 12, 14. In certain applications, such as a short oval, a single primary winding may be provided. One end for each of the forward and reverse conduction paths is connected to a power source and the other end for each of the forward and reverse conduction paths is electrical connected to each other to establish a conductive loop. In other applications, for example, due to an extended track length, it may be desirable to provide multiple primary windings 172, where each primary winding extends for a portion of the length of the track 10. According to one embodiment of the invention, each track segment 12, 14 includes a separate primary winding 172 extending the length of the track segment.

Figure 7:
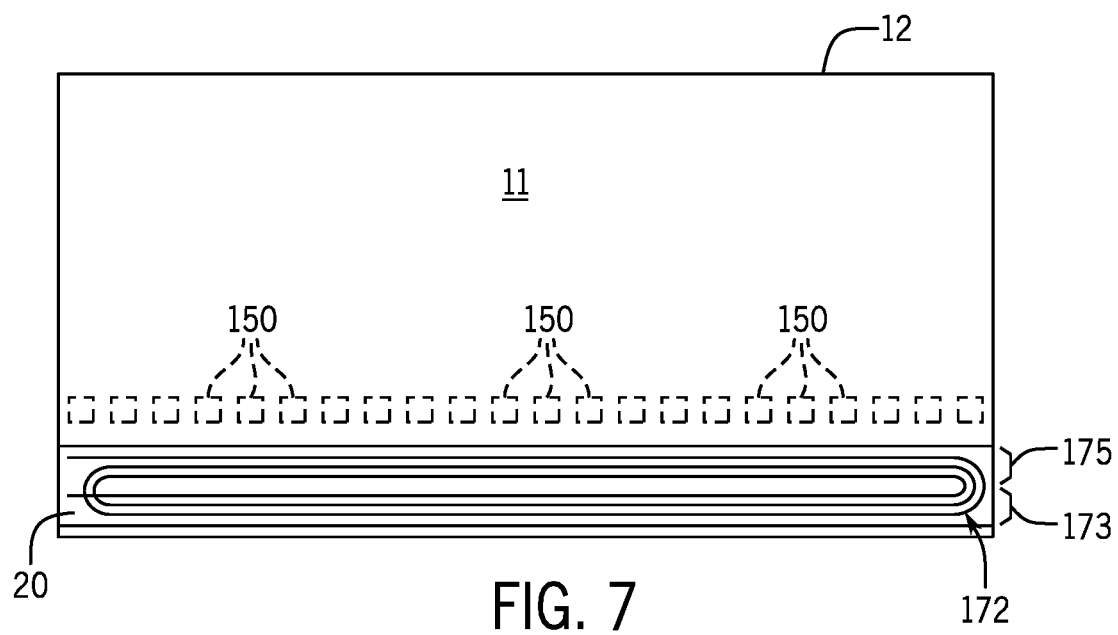
FIG. 7 is a partial top plan view of a track segment illustrating a primary winding for one embodiment of a sliding transformer mounted along the track segment.

The forward and reverse conduction paths 173, 175 for the primary winding 172 may include either a single conductor or multiple conductors. With reference to FIG. 5, a first bus bar 174 is provided in the forward conduction path 173 and a second bus bar 176 is provided in the reverse conduction path 175. If a separate primary winding 172 is present on each track segment, one end of each bus bar 174, 176 is connected to a power source and the other end of each bus bar may include an end cap joining the two bus bars and establishing a conductive loop. If the primary winding 172 spans multiple track segments, then an electrical connector may be provided between track segments to join adjacent bus bars. With reference to FIG. 7, the primary winding 172 may also include multiple conductors in each of the forward and reverse conduction paths 173, 175. According to one embodiment of the invention, a single conductor may be wound along the length of the track segment 12 to form a coil. According to another embodiment of the invention, a printed circuit board (PCB) may be mounted along the length of the track segment 12 and a number of traces may be defined along the PCB to define the coil. In either embodiment, a first portion of the conductors define the forward conduction path 173 and a second portion of the conductors define the reverse conduction path 175.

The secondary winding 182 includes a forward conduction path 183 and a reverse conduction path 185 extending in the direction of motion of the mover 100. It is contemplated that each mover 100 will include a single secondary winding 182. However, in some embodiments, multiple secondary windings 182 may be mounted on a mover 100 with each secondary winding 182 receiving power from the primary winding 172. One end for each of the forward and reverse conduction paths is electrically connected to each other to establish a conductive loop and the other end supplies power to an electrical load on the mover 100. It is contemplated that the electrical load may be an electrical device 300 such as an actuator or a sensor, which may be energized by either an alternating current (AC) voltage or a direct current (DC) voltage. A power converter 260 is provided to regulate the power flow received from the secondary winding 182 to the electrical load.

Figure 8:
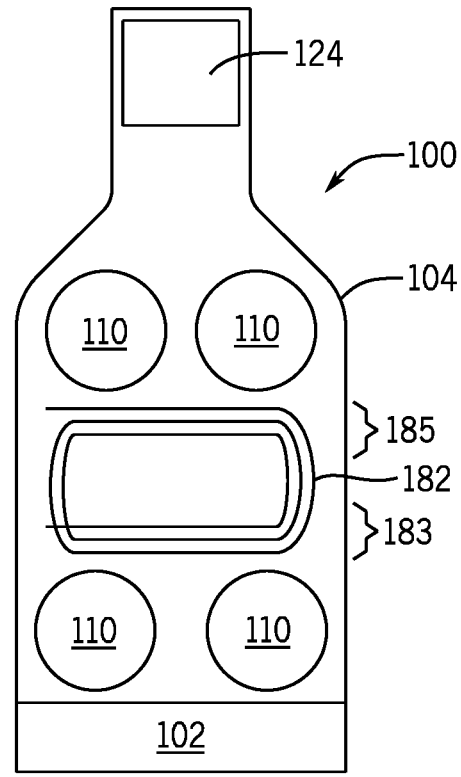
FIG. 8 is a partial sectional view of a mover illustrating a secondary winding for the sliding transformer of FIG. 7 mounted along the lower surface of the top member of the mover.

The forward and reverse conduction paths 183, 185 for the secondary winding 182 may include either a single conductor or multiple conductors. With reference to FIG. 5, a first bus bar 184 is provided in the forward conduction path 183 and a second bus bar 186 is provided in the reverse conduction path 185. One end of each bus bar 184, 186 is connected to the electrical load on the mover 100 and the other end of each bus bar may include an end cap joining the two bus bars and establishing a conductive loop. With reference to FIG. 8, the secondary winding 182 may also include multiple conductors in each of the forward and reverse conduction paths 183, 185. According to one embodiment of the invention, a single conductor may be wound along the mover 100 in the direction of travel of the mover 100 to form a coil. According to another embodiment of the invention, a printed circuit board (PCB) may be mounted to the mover 100 and a number of traces may be defined along the PCB to define the coil. In either embodiment, a first portion of the conductors define the forward conduction path 183 and a second portion of the conductors define the reverse conduction path 185.

Figure 9:
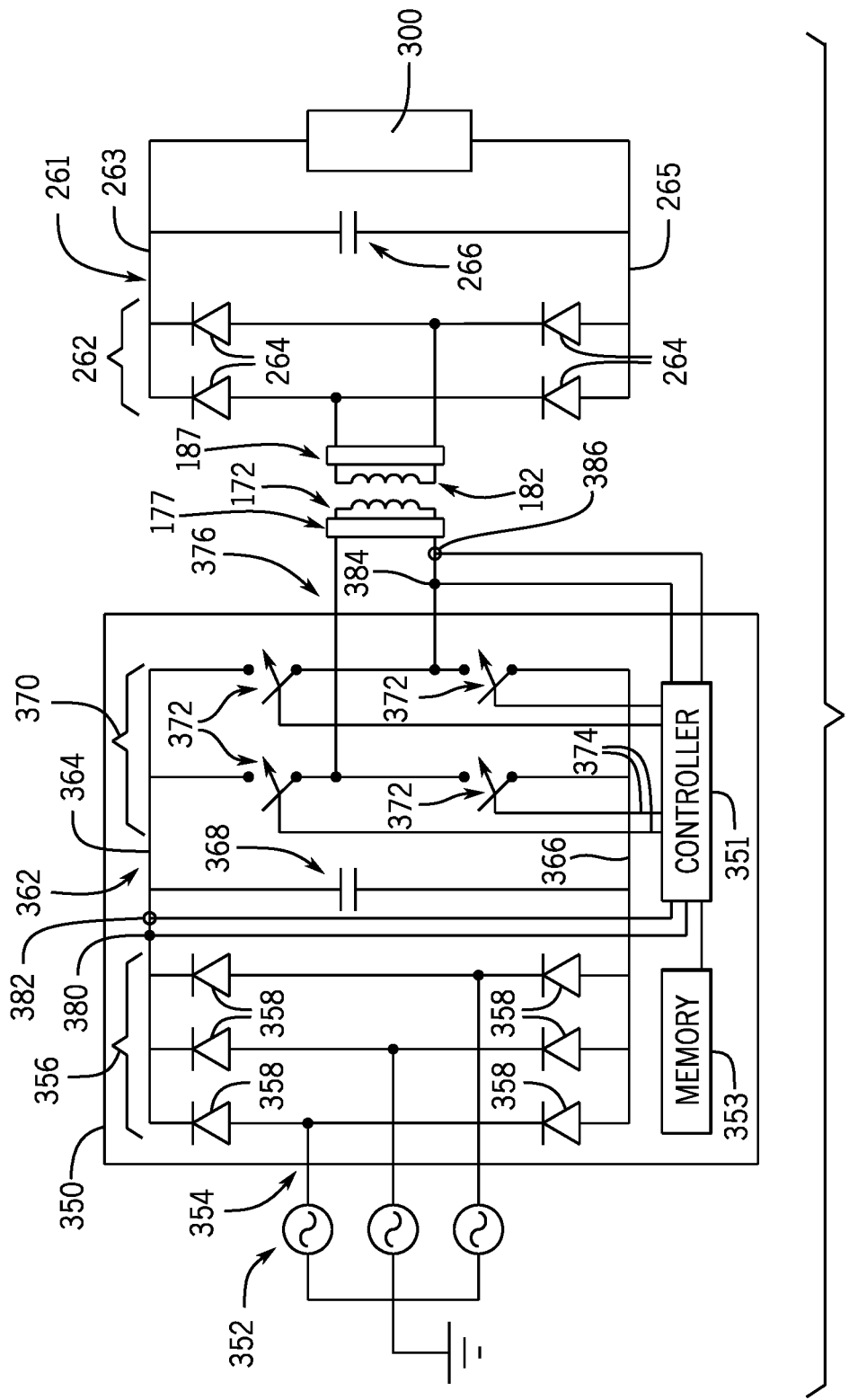
FIG. 9 is a schematic representation of one embodiment of a power converter supplying power to a sliding transformer according to one embodiment of the present invention.

Turning next to FIG. 9, an exemplary power converter 350 for supplying power to the primary winding 172 is illustrated. The power converter 350 is configured to receive a three-phase AC voltage 352 at an input 354 of the power converter. The three-phase AC voltage 352 is, in turn, provided to a rectifier section 356 of the power converter 350. The rectifier section 356 may include any electronic device suitable for passive or active rectification as is understood in the art. According to the illustrated embodiment, the rectifier section 356 includes a set of diodes 358 forming a diode bridge that rectifies the three-phase AC voltage to a DC voltage on the DC bus 362. Optionally, the rectifier section 356 may include other solid-state devices including, but not limited to, thyristors, silicon controlled rectifiers (SCRs), or transistors to convert the input voltage 352 to a DC voltage for the DC bus 362. The DC voltage is present between a positive rail 364 and a negative rail 366 of the DC bus 362. A DC bus capacitor 368 is connected between the positive and negative rails, 364 and 366, to reduce the magnitude of the ripple voltage resulting from converting the AC voltage to a DC voltage. It is understood that the DC bus capacitor 368 may be a single capacitor or multiple capacitors connected in parallel, in series, or a combination thereof. The magnitude of the DC voltage between the positive and negative rails, 364 and 366, is generally equal to the magnitude of the peak of the AC input voltage.

The DC bus 362 is connected in series between the rectifier section 356 and an inverter section 370. The inverter section 370 consists of a number of switches 372. Each switch 372 is preferably a solid-state switching element, such as a transistor, thyristor, or SCR as is known in the art. The switching element may also include a free-wheeling diode connected across the switching element. Each of the switches 372 receives a switching signal, sometimes referred to as a gating signal, 374 to selectively enable the switch 372 and to convert the DC voltage from the DC bus 362 into a controlled AC voltage at an output 376 of the inverter section 370. When enabled, each switch 372 connects the respective rail 364, 366 of the DC bus 362 to an output terminal. The primary winding 172 is connected to the output 376 of the inverter section to receive the controlled AC voltage as a power source for transmitting power from the track 10 to the movers 100.

One or more modules are used to control operation of the power converter 350. The modules may be stored programs executed on one or more processors, logic circuits, or a combination thereof. According to the illustrated embodiment, the power converter 350 includes a controller 351 and a memory device 353 in communication with the controller 351. The controller 351 may be implemented, for example, in a microprocessor, application specific integrated circuit (ASIC), field programmable gate array (FPGA), or other such customizable device. The memory device 353 may include transitory memory, non-transitory memory or a combination thereof. The memory device 353 may be configured to store data and programs, which include a series of instructions executable by the controller 351. It is contemplated that the memory device 353 may be a single device, multiple devices, or incorporated, for example, as a portion of another device such as an application specific integrated circuit (ASIC). The controller 351 is in communication with the memory 353 to read the instructions and data as required to control operation of the power converter 350.

The controller 351 also receives feedback signals indicating the current operation of the power converter 350. The power converter 350 may include a voltage sensor 380 and/or a current sensor 382 on the DC bus 362 generating a feedback signal corresponding to the magnitude of voltage and/or current present on the DC bus 362. The power converter 350 may also include a voltage sensor 384 and/or a current sensor 386 generating a feedback signal corresponding to the magnitude of voltage and/or current present at the output 376 of the inverter section 370. The controller 351 utilizes the feedback signals to generate the switching signals 374 to control operation of the inverter section 370 and to generate an output voltage having a desired magnitude and frequency for the primary winding 172.

It is contemplated that impedance matching circuits may be provided on one or both sided of the sliding transformer.

A first impedance matching circuit 177 is illustrated between the utility power supply 171 and the primary winding 172, and a second impedance matching circuit 187 is illustrated between the secondary winding 182 and the power converter 260. The impedance matching circuit 177 may include one or more reactive components, such as an inductor and/or a capacitor, and resistors may be connected in series or parallel to create a resonant circuit. The frequency of the resonant circuit is selected to amplify a magnitude of voltage and/or current present on the windings to maximize power transfer across the sliding transformer.

Figure 6:
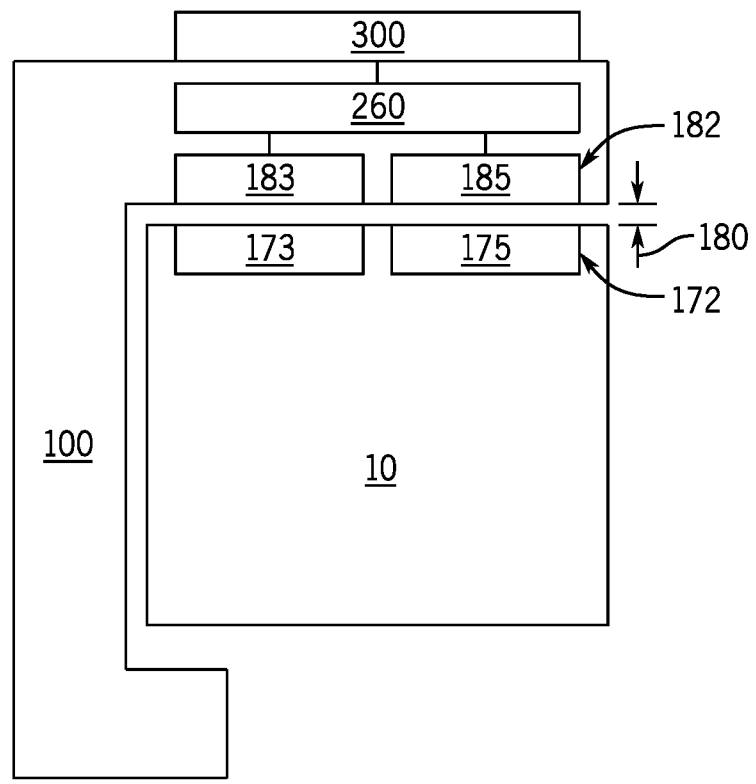
FIG. 6 is a block diagram representation of the mover illustrated in FIG. 3.

With reference also to FIG. 6, the secondary winding 182 is spaced apart from the primary winding 172 by an air gap 180. The current conducted in the primary winding 172 establishes an electromagnetic field along the forward and reverse conduction paths 173, 175. The forward and reverse conduction paths 183, 185 of the secondary winding 182 are generally aligned with the forward and reverse conduction paths 173, 175 of the primary winding 172 and separated by the air gap 180. In order for a current to be induced within the secondary winding 182 by the electromagnetic field generated by the primary winding 172, the secondary winding 182 must be located within the field. Thus, the air gap 180 is small and may be, for example, less than 1.5 millimeters wide and, preferably, is less than 0.75 millimeters wide. In one embodiment of the invention, it is contemplated that the air gap 180 is about 0.5 millimeters wide.

Referring again to FIG. 9, the illustrated mover includes a rectifier section 262 with a set of diodes 264 to convert the AC voltage induced in the secondary winding 182 to a DC voltage present on a DC bus 261. A DC bus capacitor 266 is connected between the positive and negative rails, 263 and 265, to reduce the magnitude of the ripple voltage resulting from converting the AC voltage to a DC voltage. An electrical load 300 may is applied to the DC bus 261. The power converter 350 on the track 10 is configured to regulate the voltage and/or current supplied to the primary winding 172 to, in turn, provide a desired power level to the electrical load 300.

Figure 10:
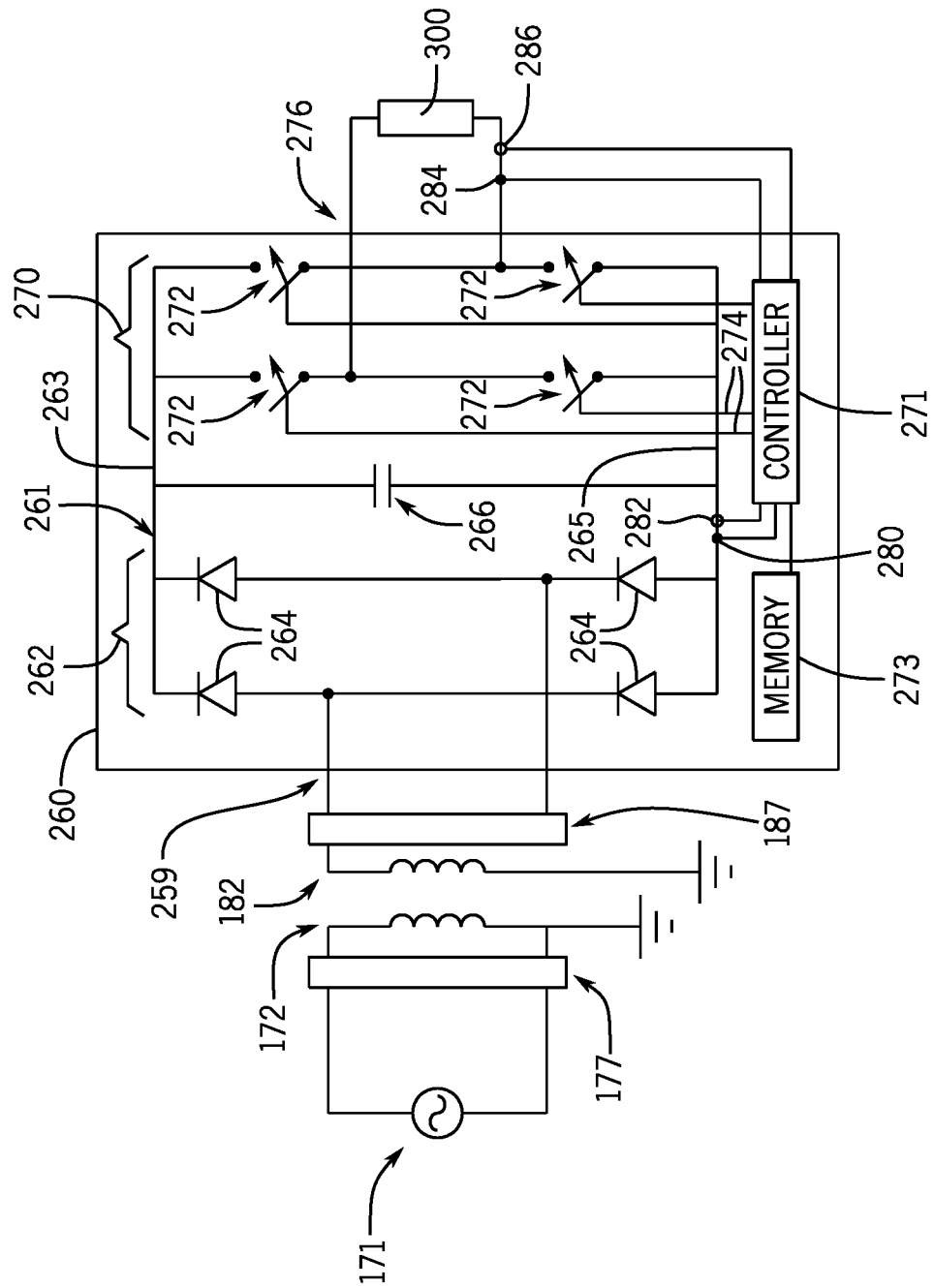
FIG. 10 is a schematic representation of one embodiment of a power converter mounted on the mover to regulate power from a sliding transformer according to one embodiment of the present invention.

According to another embodiment of the invention, shown in FIG. 10, the mover 100 may also include a power converter 260 to regulate power flow on the mover 100. The power converter 260 is configured to receive the AC voltage from the secondary winding 182 at an input 259 of the power converter. It is contemplated that impedance matching circuits may be provided on one or both sided of the sliding transformer. A first impedance matching circuit 177 is illustrated between the utility power supply 171 and the primary winding 172, and a second impedance matching circuit 187 is illustrated between the secondary winding 182 and the power converter 260. The AC voltage from either the secondary winding 182 or the impedance matching circuit 187, if provided, is, in turn, provided to a rectifier section 262 of the power converter 260. The rectifier section 262 may include any electronic device suitable for passive or active rectification as is understood in the art. According to the illustrated embodiment, the rectifier section 262 includes a set of diodes 264 forming a diode bridge that rectifies the AC voltage to a DC voltage on the DC bus 261. Optionally, the rectifier section 262 may include other solid-state devices including, but not limited to, thyristors, silicon controlled rectifiers (SCRs), or transistors to convert the input voltage to a DC voltage for the DC bus 261. The DC voltage is present between a positive rail 263 and a negative rail 265 of the DC bus 261. A DC bus capacitor 266 is connected between the positive and negative rails, 263 and 265, to reduce the magnitude of the ripple voltage resulting from converting the AC voltage to a DC voltage. It is understood that the DC bus capacitor 266 may be a single capacitor or multiple capacitors connected in parallel, in series, or a combination thereof. The magnitude of the DC voltage between the positive and negative rails, 263 and 265, is generally equal to the magnitude of the peak of the AC input voltage.

The DC bus 261 is connected in series between the rectifier section 262 and a switching section 270. It is contemplated that the switching section 270 may be configured to provide either an AC voltage output or a DC voltage output. The DC voltage output may be at a different voltage potential than the DC voltage potential present on the DC bus 261. According to the illustrated embodiment, the switching section 270 is arranged as an inverter to provide an AC voltage output. The switching section 270 consists of a number of switches 272. Each switch 272 is preferably a solid-state switching element, such as a transistor, thyristor, or SCR as is known in the art. The switching element may also include a free-wheeling diode connected across the switching element. Each of the switches 272 receives a switching signal, sometimes referred to as a gating signal, 274 to selectively enable the switch 272 and to convert the DC voltage from the DC bus 261 into a controlled AC voltage at an output 276 of the switching section 270. When enabled, each switch 272 connects the respective rail 263, 265 of the DC bus 261 to an output terminal. One or more electrical loads 300 are connected to the output 276 of the inverter section to receive the controlled AC voltage as a power source to enable operation of the device on the mover 100.

One or more modules are used to control operation of the power converter 260. The modules may be stored programs executed on one or more processors, logic circuits, or a combination thereof. According to the illustrated embodiment, the power converter 260 includes a controller 271 and a memory device 273 in communication with the controller 271. The controller 271 may be implemented, for example, in a microprocessor, application specific integrated circuit (ASIC), field programmable gate array (FPGA), or other such customizable device. The memory device 273 may include transitory memory, non-transitory memory or a combination thereof. The memory device 273 may be configured to store data and programs, which include a series of instructions executable by the controller 271. It is contemplated that the memory device 273 may be a single device, multiple devices, or incorporated, for example, as a portion of another device such as an application specific integrated circuit (ASIC). The controller 271 is in communication with the memory 273 to read the instructions and data as required to control operation of the power converter 260.

The power converter 260 also receives feedback signals indicating the current operation of the power converter 260. The power converter 260 may include a voltage sensor 280 and/or a current sensor 282 on the DC bus 261 generating a feedback signal corresponding to the magnitude of voltage and/or current present on the DC bus 261. The power converter 260 may also include a voltage sensor 284 and/or a current sensor 286 generating a feedback signal corresponding to the magnitude of voltage and/or current present at the output 276 of the switching section 270. The controller 271 utilizes the feedback signals to generate the switching signals 274 to control operation of the switching section 270 and to generate a desired output voltage for the load 300 present on the mover 100.

Turning next to FIGS. 15-18, a generator 402 may be mounted to the mover 100 to provide power for use on the mover 100. The generator 402 includes a drive shaft 404 connected to a drive wheel 406. The drive wheel 406 may be, for example, a friction wheel, aligned with a side of a rail 20 or with a side surface 21 of the track segment 12. As the mover 100 is commanded to travel along the track, the drive wheel 406 engages the side of the rail 20, causing the drive wheel 406 to turn. The drive wheel 406, in turn, rotates the drive shaft 404 causing a rotor within the generator to turn. As would be understood by one skilled in the art, rotation of the rotor generates power at an output of the generator due, for example, to rotation of permanent magnets mounted to the rotor, generating a magnetic field within the generator that induces a voltage and/or current on a stator coil within the generator. A cable 408 connects the output of the generator to a power converter 410 mounted on the mover 100.

Figure 18:
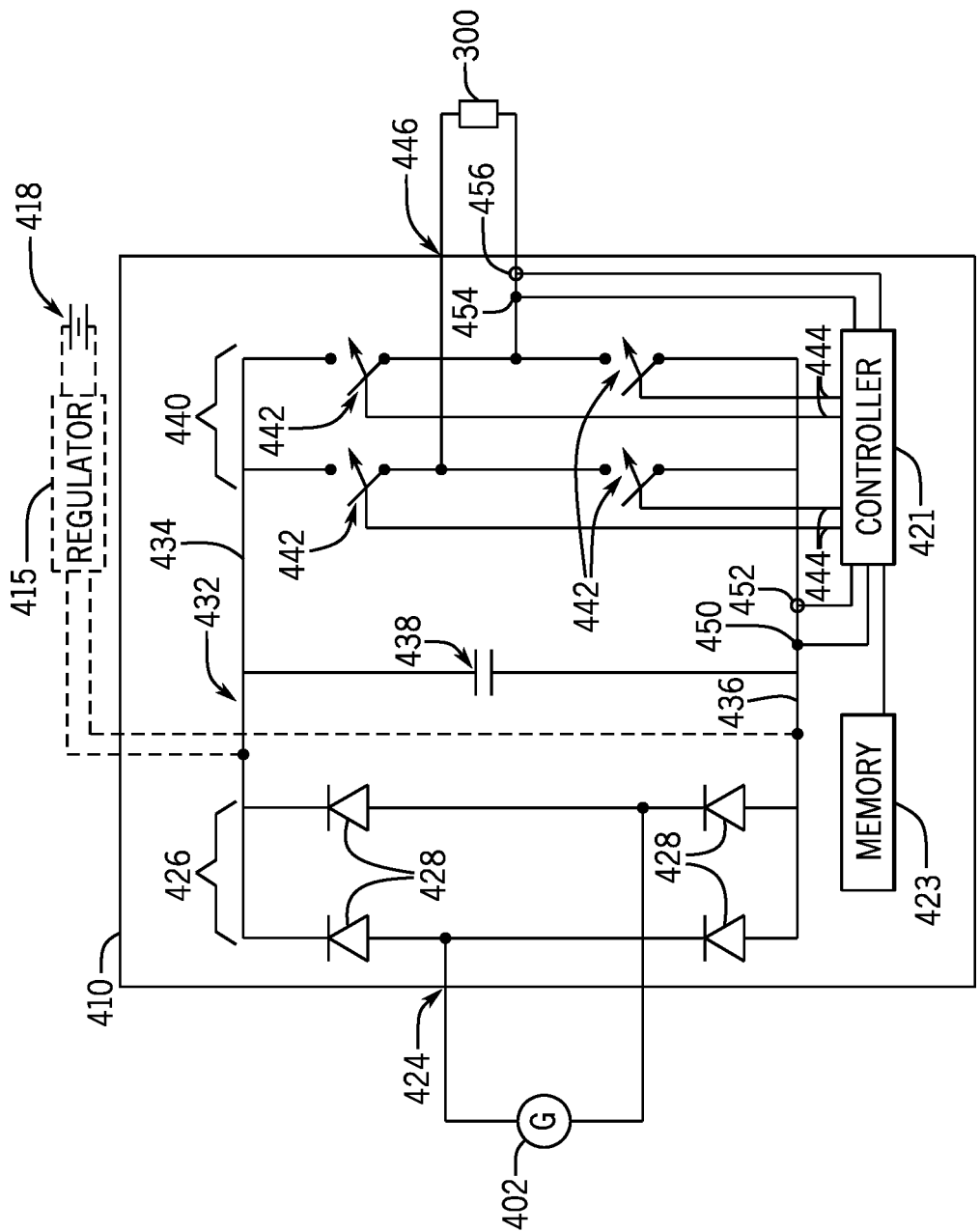
FIG. 18 is a schematic representation of one embodiment of a power converter mounted on the mover to regulate power from a generator mounted on the mover according to one embodiment of the present invention.

The power converter 410, as shown in more detail in FIG. 18, may be configured to receive an AC voltage from the generator 402 and convert the AC voltage to a desired AC or DC voltage for use by an electronic device on the mover 100. The illustrated power converter 410 receives the AC voltage from the generator 402 at an input 424 of the power converter. The AC voltage is, in turn, provided to a rectifier section 426 of the power converter 410. The rectifier section 426 may include any electronic device suitable for passive or active rectification as is understood in the art. According to the illustrated embodiment, the rectifier section 426 includes a set of diodes 428 forming a diode bridge that rectifies the three-phase AC voltage to a DC voltage on the DC bus 432. Optionally, the rectifier section 426 may include other solid-state devices including, but not limited to, thyristors, silicon controlled rectifiers (SCRs), or transistors to convert the input voltage to a DC voltage for the DC bus 432. The DC voltage is present between a positive rail 436 and a negative rail 436 of the DC bus 432. A DC bus capacitor 438 is connected between the positive and negative rails, 434 and 436, to reduce the magnitude of the ripple voltage resulting from converting the AC voltage to a DC voltage. It is understood that the DC bus capacitor 438 may be a single capacitor or multiple capacitors connected in parallel, in series, or a combination thereof. The magnitude of the DC voltage between the positive and negative rails, 434 and 436, is generally equal to the magnitude of the peak of the AC input voltage.

According to the illustrated embodiment, the DC bus 432 is connected in series between the rectifier section 426 and an inverter section 440. The inverter section 440 consists of a number of switches 4422. Each switch 442 is preferably a solid-state switching element, such as a transistor, thyristor, or SCR as is known in the art. The switching element may also include a free-wheeling diode connected across the switching element. Each of the switches 442 receives a switching signal, sometimes referred to as a gating signal, 444 to selectively enable the switch 442 and to convert the DC voltage from the DC bus 432 into a controlled AC voltage at an output 446 of the inverter section 440. When enabled, each switch 442 connects the respective rail 434, 436 of the DC bus 432 to an output terminal. The AC voltage present at the output 446 of the power converter 410 may be supplied to and provide power for AC electrical devices 300 present on the mover 100.

Optionally, the power converter 410 may be configured to supply a DC voltage to an electrical device 300 on the mover. Rather than having an inverter section 440 as shown in FIG. 18, the power converter may include a DC-to-DC power converter that converts the voltage present on the DC bus 432 to another DC voltage suitable for powering the DC electrical device 300. Optionally, the AC voltage from the generator 402 may be converted directly to the desired DC voltage desired to power a DC electrical device 300 and the device 300 may be connected directly to the DC bus 432. As further illustrated in FIG. 18, an energy storage device 418 such as a battery or a super-capacitor may be mounted to the mover 100. An energy regulator 415 may be provided to charge the energy storage device 418 when excess electrical energy is being generated by the generator 402, and the energy regulator 415 may supply the stored energy from the energy storage device 418 to the DC bus 432 when the energy demanded from the electrical devices 300 exceed the energy being generated by the generator 402. It is further contemplated that the energy regulator 415 may be incorporated within the power converter 410 such that the controller 421 for the power converter 410 also controls the energy regulator 415.

One or more modules are used to control operation of the power converter 410. The modules may be stored programs executed on one or more processors, logic circuits, or a combination thereof. According to the illustrated embodiment, the power converter 410 includes a controller 421 and a memory device 423 in communication with the controller 421. The controller 421 may be implemented, for example, in a microprocessor, application specific integrated circuit (ASIC), field programmable gate array (FPGA), or other such customizable device. The memory device 423 may include transitory memory, non-transitory memory or a combination thereof. The memory device 423 may be configured to store data and programs, which include a series of instructions executable by the controller 421. It is contemplated that the memory device 423 may be a single device, multiple devices, or incorporated, for example, as a portion of another device such as an application specific integrated circuit (ASIC). The controller 421 is in communication with the memory 423 to read the instructions and data as required to control operation of the power converter 410.

The controller 421 also receives feedback signals indicating the current operation of the power converter 410. The power converter 410 may include a voltage sensor 450 and/or a current sensor 452 on the DC bus 432 generating a feedback signal corresponding to the magnitude of voltage and/or current present on the DC bus 432. The power converter 410 may also include a voltage sensor 454 and/or a current sensor 456 generating a feedback signal corresponding to the magnitude of voltage and/or current present at the output 446 of the inverter section 440. The controller 421 utilizes the feedback signals to generate the switching signals 444 to control operation of the inverter section 440 and to generate an output voltage having a desired magnitude and frequency for the electrical devices 300 present on the mover 100.

With reference again to FIG. 15, the power converter 410 is illustrated as mounted on a circuit board 412 and stand-offs 414 on the upper surface of the mover 100. An energy storage device 418 is similarly mounted to the upper surface of the mover 100 and connected to the power converter 410 via a cable 416. The illustrated embodiment further includes a platform 420 mounted to the top surface of the mover 100 with stand-offs 422. The platform 420 may be configured, for example, to receive a work piece, additional fixtures, or the electronic devices 300 to be powered by the generator 402. The illustrated embodiment is intended to be exemplary and is not intended to be limiting. An alternate embodiment, for example, may include an enclosed module which includes the power converter 410 and/or the energy storage device 418. The enclosed module may be mounted to the top, side, or bottom of the mover 100.

Figure 21:
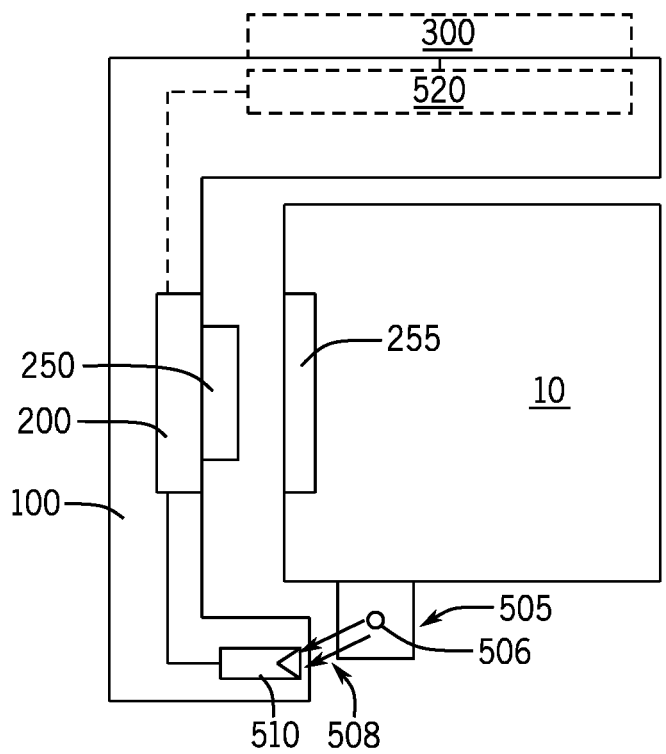
FIG. 21 is a block diagram representation of an embodiment of the mover including motor coils on the mover as used with the transport system illustrated in FIG. 19.
Figure 22:
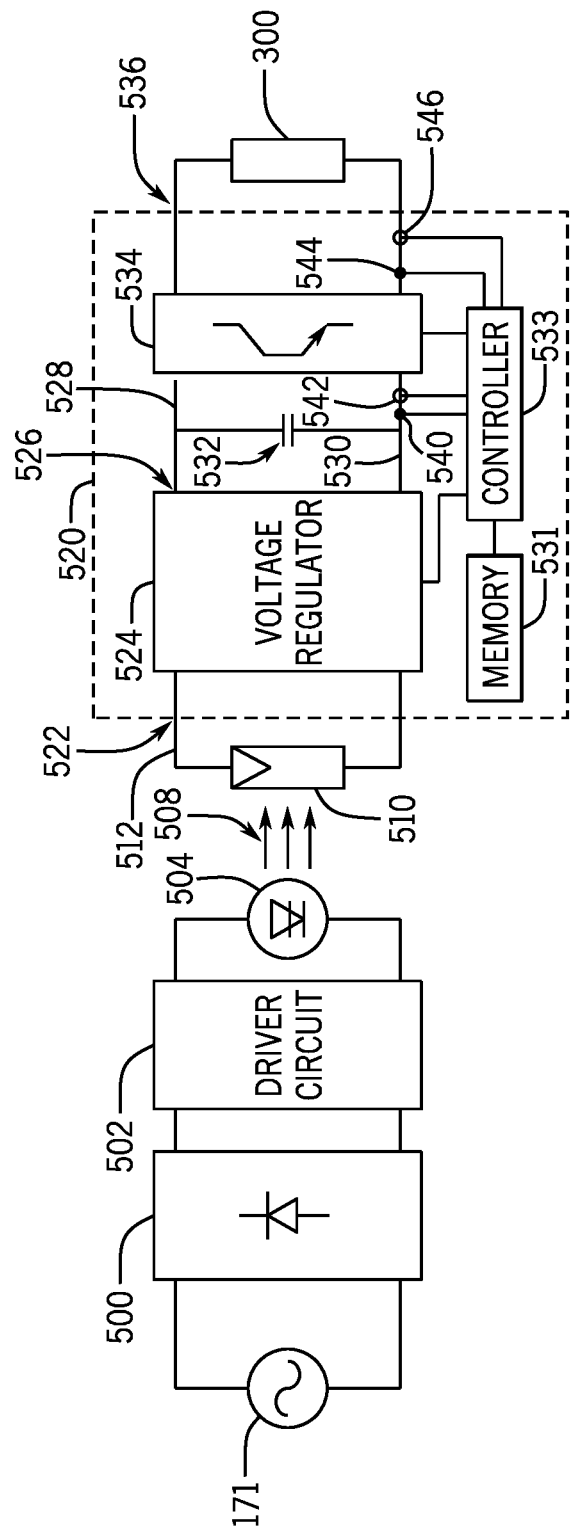
FIG. 22 is a schematic representation of one embodiment of a power converter mounted on the mover to regulate power from an optical transmitter according to one embodiment of the present invention.

Turning next to FIGS. 19-22, an optical transmitter 505 may be mounted to the track and be configured to transmit power to the mover 100 via a light beam 508. According to the illustrated embodiment, a mounting fixture 501 extends down below the track segment 12 an is configured to receive the light from the optical transmitter 505. The optical transmitter 505 may be, for example, one or more laser diodes 504 mounted within a housing 503 which is, in turn attached to the mounting fixture 501. As shown in FIG. 22, the optical transmitter 505 may receive power from a utility supply 171. The AC voltage from the utility may be converted to a DC voltage with a rectifier circuit 500. It is contemplated that the utility voltage may be provided to each track segment 12 with separate rectifier circuits 500 similarly mounted on each track segment 12. Optionally, one or more front-end rectifier units may receive the utility voltage and supply a DC voltage to the track or a portion of the track, and each track segment 12 receives the DC voltage from the front-end rectifier unit. Each rectifier circuit 500 or front-end rectifier unit may include any electronic device suitable for passive or active rectification as is understood in the art. According to the illustrated embodiment, the rectifier circuit 500 includes a set of diodes forming a diode bridge that rectifies the AC voltage from the utility supply 171 to a DC voltage for the driver circuit 502. Optionally, the rectifier circuit 500 may include other solid-state devices including, but not limited to, thyristors, silicon controlled rectifiers (SCRs), or transistors to convert the input voltage to a DC voltage. The DC voltage is provided to a driver circuit 502, which, in turn, enables one or more laser diodes 504. Optionally, the driver circuit 502 may receive an AC voltage directly and incorporate a rectifier circuit or other power conversion circuit to supply a DC voltage to the laser diode 504. Although illustrated as a single laser diode 504, it is contemplated that multiple laser diodes 504 may be utilized. The optical transmitter 505 may also include one or more optical devices, such as filters, lenses, and the like to direct and focus the light emitted from each laser diode 504 toward a receiver mounted on the mover 100.

The receiver 510 on the mover 100 includes one or more devices that convert light energy into electrical energy. According to the illustrated embodiment, the receiver 510 includes one or more photovoltaic modules and may form a photovoltaic array. Light incident on the photovoltaic array 510 is converted into electrical energy. Because the frequency of the light emitted from the optical transmitter 505 may be selected and/or is known, the construction of the photovoltaic array 510 may be selected to improve the efficiency of energy conversion between optical energy and electrical energy.

A power converter 520, as shown in more detail in FIG. 22, may be configured to receive a DC voltage from the PV array 510 and convert the input DC voltage to either an AC voltage or a DC voltage of another amplitude for use by an electronic device on the mover 100. The illustrated power converter 520 receives the DC voltage from the PV array 510 at an input 522 to the power converter 520. The DC voltage is, in turn, provided to a voltage regulator 524. As is understood, a PV array 510 typically outputs a DC voltage. The amplitude of the DC voltage may be different than an amplitude of a DC voltage needed to operate an electrical device 300 on the mover 100. Similarly, the amplitude of the DC voltage may be different than an amplitude of a DC voltage needed to supply an AC voltage to an electrical device 300 on the mover 100. The voltage regulator 524 may be configured as a buck converter or a boost converter to change the voltage level from a first amplitude supplied by the PV array 510 to a second amplitude required by other devices mounted on the mover 100. The voltage regulator 524 may further include devices, such as capacitors and the like to reduce voltage ripple due to changes in the amount of light incident on the PV array 510 and to help maintain the voltage level at a desired voltage level. The DC voltage output from the voltage regulator is present between a positive rail 528 and a negative rail 530 of a DC bus 526. A DC bus capacitor 532 is shown connected between the positive and negative rails, 528 and 530, to reduce the magnitude of the ripple voltage present on the DC bus 526. As previously indicated, it is contemplated that the DC bus capacitor 532 may be incorporated into the voltage regulator 425 and/or in the inverter section 534.

According to the illustrated embodiment, the DC bus 526 is connected in series between the voltage regulator 524 and an inverter section 534. The inverter section 534 is used to provide an AC voltage to electrical devices 300 mounted on the mover 100. The inverter section 534 may consist of a number of switches, as discussed above in other inverter sections. Each switch is preferably a solid-state switching element, such as a transistor, thyristor, or SCR as is known in the art. The switching element may also include a free-wheeling diode connected across the switching element. Each of the switches receives a switching signal, sometimes referred to as a gating signal, to selectively enable the switch and to convert the DC voltage from the DC bus 526 into a controlled AC voltage at an output 536 of the inverter section 534. The AC voltage present at the output 536 of the power converter 520 may be supplied to and provide power for AC electrical devices 300 present on the mover 100.

Optionally, the power converter 520 may be configured to supply a DC voltage to an electrical device 300 on the mover. Each DC electrical device 300 may be connected directly to the DC bus 526. Optionally, a separate DC-to-DC power converter may be provided to convert the voltage present on the DC bus 526 to another DC voltage suitable for powering the DC electrical device 300. According to still another embodiment, the voltage regulator 524 may be configured to output multiple DC voltages including, for example, positive or negative five volts (+/−5 VDC) or positive or negative twenty-four volts (+/−24 VDC).

Figure 19:
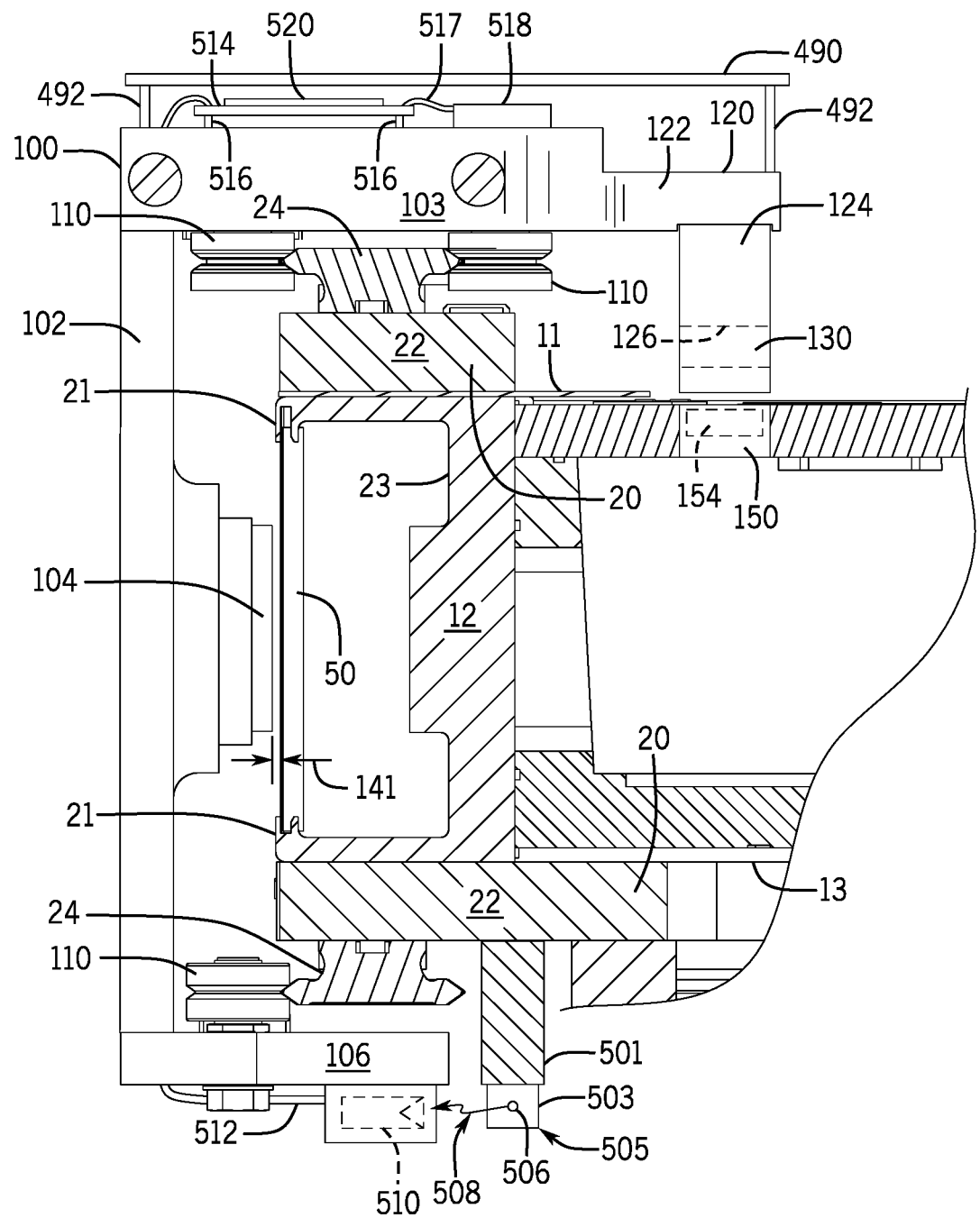
FIG. 19 is a partial sectional view of another embodiment of the transport system.
Figure 20:
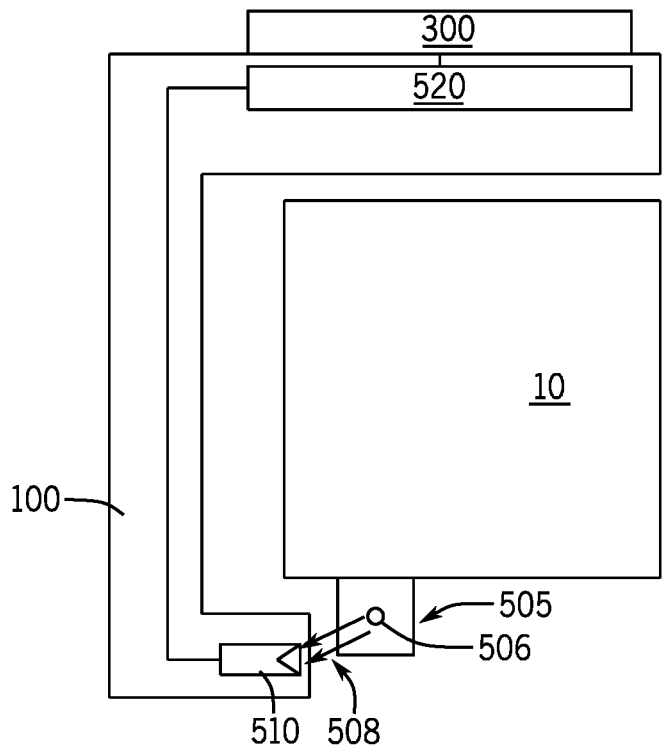
FIG. 20 is a block diagram representation of one embodiment of the mover illustrated in FIG. 19.

As further illustrated in FIG. 19, an energy storage device 518 such as a battery or a super-capacitor may be mounted to the mover 100. The energy storage device 518 may include a dedicated energy regulator to charge the energy storage device 518 when excess electrical energy is being generated by the photovoltaic array 510 and to draw the stored energy from the energy storage device 518 to the DC bus 526 when the energy demanded from the electrical devices 300 exceed the energy being generated by the photovoltaic array 510. Optionally, the energy storage device 518 may be connected directly to the DC bus 526. It is further contemplated that an energy regulator for the energy storage device 518 may be incorporated within the voltage regulator 524 such that the controller 533 for the power converter 520 also controls the energy regulator.

One or more modules are used to control operation of the power converter 520. The modules may be stored programs executed on one or more processors, logic circuits, or a combination thereof. According to the illustrated embodiment, the power converter 520 includes a controller 533 and a memory device 531 in communication with the controller 533. The controller 533 may be implemented, for example, in a microprocessor, application specific integrated circuit (ASIC), field programmable gate array (FPGA), or other such customizable device. The memory device 531 may include transitory memory, non-transitory memory or a combination thereof. The memory device 531 may be configured to store data and programs, which include a series of instructions executable by the controller 533. It is contemplated that the memory device 531 may be a single device, multiple devices, or incorporated, for example, as a portion of another device such as an application specific integrated circuit (ASIC). The controller 533 is in communication with the memory 531 to read the instructions and data as required to control operation of the power converter 520.

The controller 533 also receives feedback signals indicating the current operation of the power converter 520. The power converter 520 may include a voltage sensor 540 and/or a current sensor 542 on the DC bus 526 generating a feedback signal corresponding to the magnitude of voltage and/or current present on the DC bus 526. The power converter 520 may also include a voltage sensor 544 and/or a current sensor 546 generating a feedback signal corresponding to the magnitude of voltage and/or current present at the output 536 of the inverter section 534. The controller 533 utilizes the feedback signals to generate the switching signals to control operation of the inverter section 534 and to generate an output voltage having a desired magnitude and frequency for the electrical devices 300 present on the mover 100. The controller 533 may additionally receive additional feedback signals from the voltage regulator 524 and may utilize the feedback signals to regulate the voltage level on the DC bus 526 and/or to supply various levels of DC voltage for use by the electrical devices 300 present on the mover 100.

With reference again to FIG. 19, the power converter 520 is illustrated as mounted on a circuit board 514 and standoffs 516 on the upper surface of the mover 100. An energy storage device 518 is similarly mounted to the upper surface of the mover 100 and connected to the power converter 520 via a cable 517. The illustrated embodiment further includes a platform 490 mounted to the top surface of the mover 100 with stand-offs 492. The platform 490 may be configured, for example, to receive a work piece, additional fixtures, or the electronic devices 300 to be powered by the optical source 505. The illustrated embodiment is intended to be exemplary and is not intended to be limiting. An alternate embodiment, for example, may include an enclosed module which includes the power converter 520 and/or the energy storage device 518. The enclosed module may be mounted to the top, side, or bottom of the mover 100.

Figure 17:
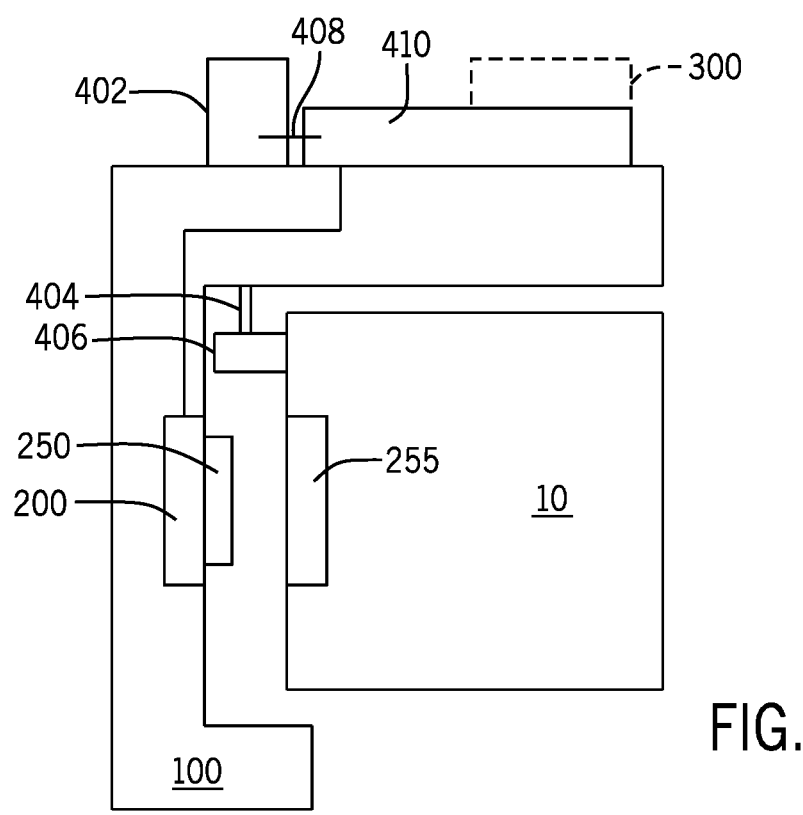
FIG. 17 is a block diagram representation of an embodiment of the mover including motor coils on the mover as used with the transport system illustrated in FIG. 15.

As previously indicated, one embodiment of the linear drive system includes drive magnets 255 arranged along the track 10 and drive coils 250 mounted to each mover. With reference then to FIGS. 11-14, one arrangement of a controller for this embodiment of the linear drive system is illustrated. A sliding transformer is provided between the track 10 and each mover 100 in the manner discussed above. Optionally, other methods of providing power to the mover 100 as it travels along the track may be utilized. The power may be supplied by the generator 402 mounted to the mover 100, as shown in FIG. 17, or by the optical source 505, as shown in FIG. 21. The power sources may further include an energy storage device (e.g., 418 or 518) to supplement power when the power source is not supplying power or not supplying sufficient power to energize the drive coils. Each mover 100 further includes a motor drive 200 configured to receive power from power source on the mover 100, such as the secondary winding 182, the generator 402, or the optical source 505.

Figure 14:
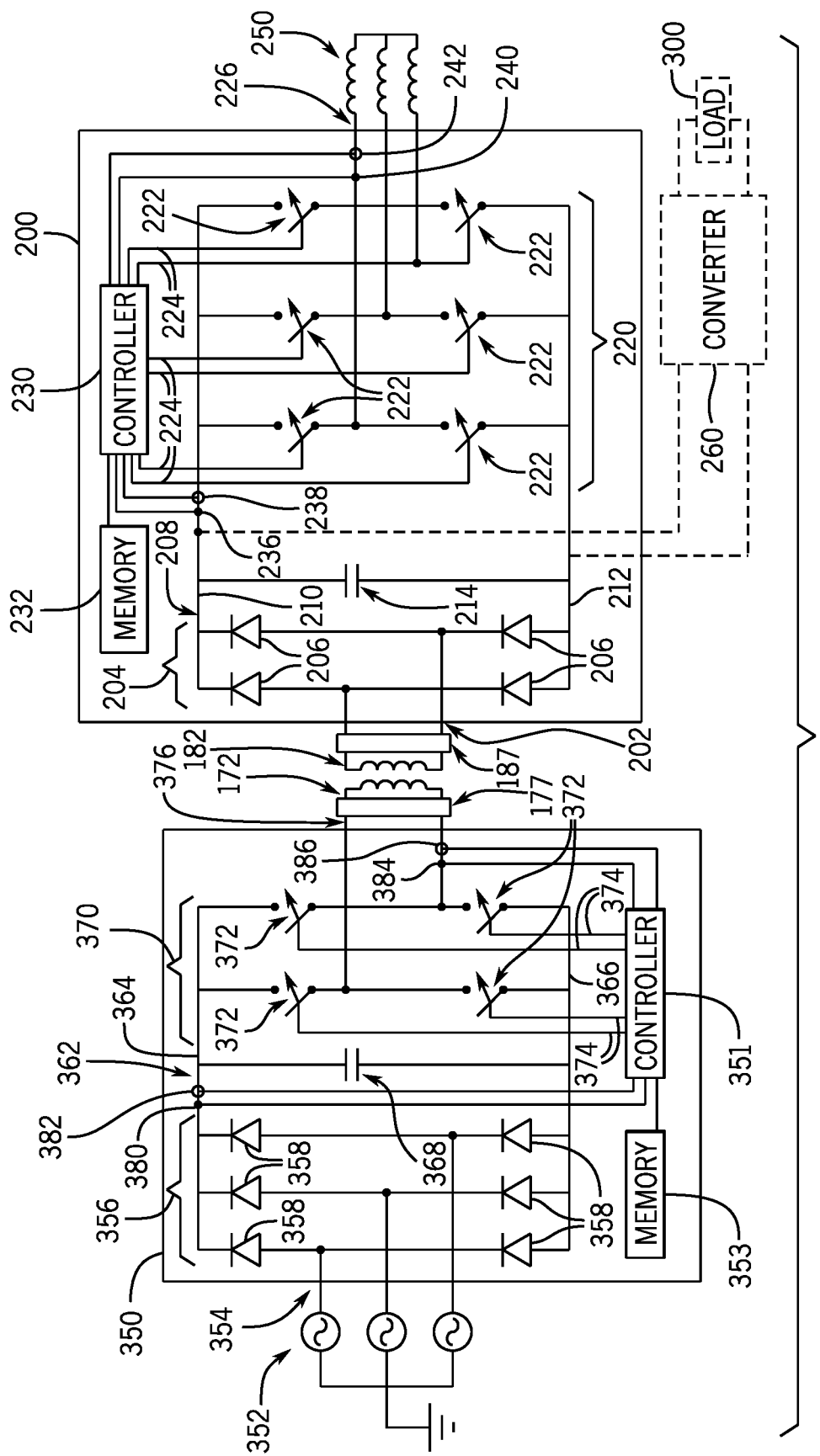
FIG. 14 is a schematic representation of a motor drive mounted on the mover to regulate power from a sliding transformer to drive coils on the mover according to one embodiment of the invention.
Figure 15:
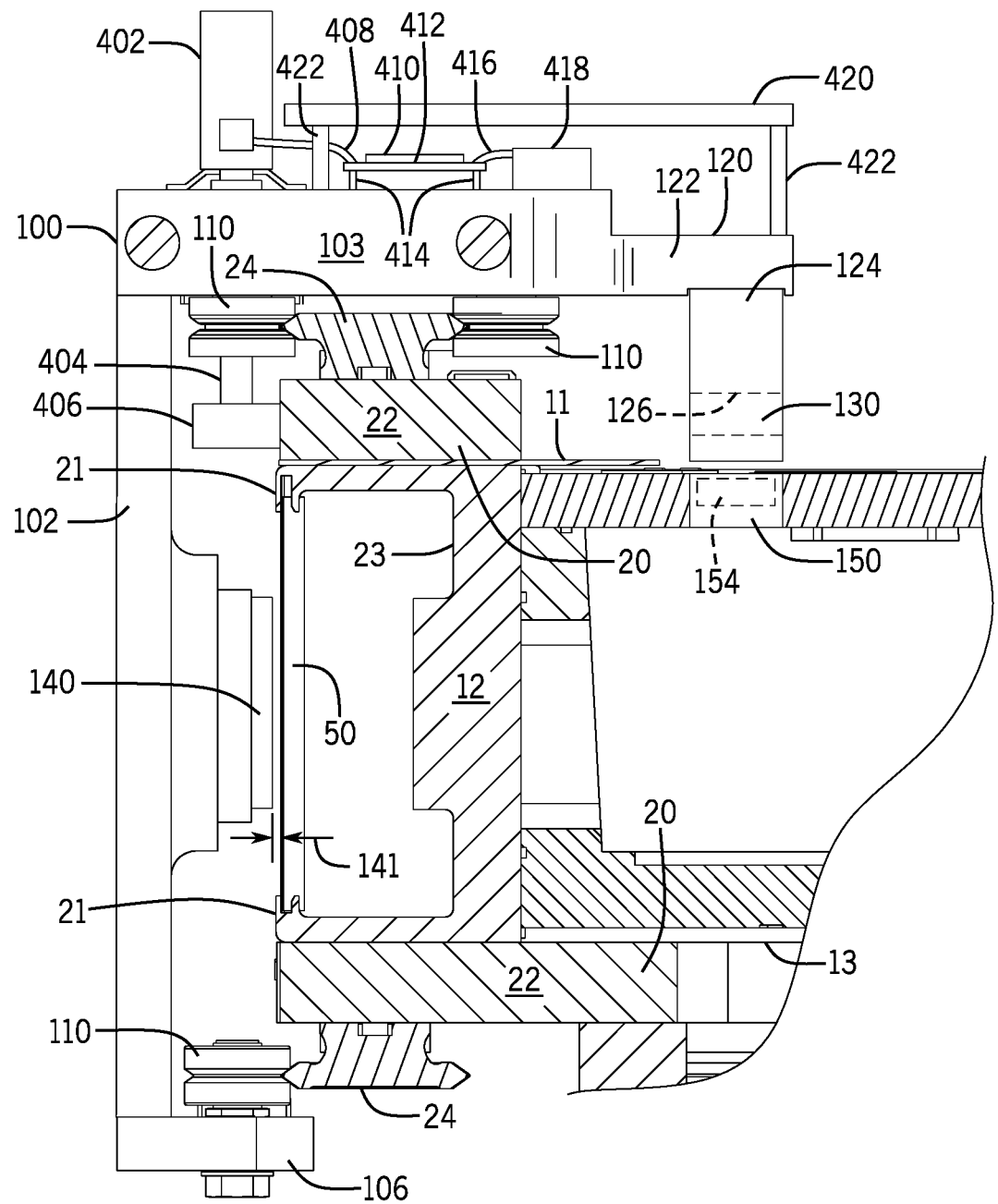
FIG. 15 is a partial sectional view of another embodiment of the transport system.
Figure 16:
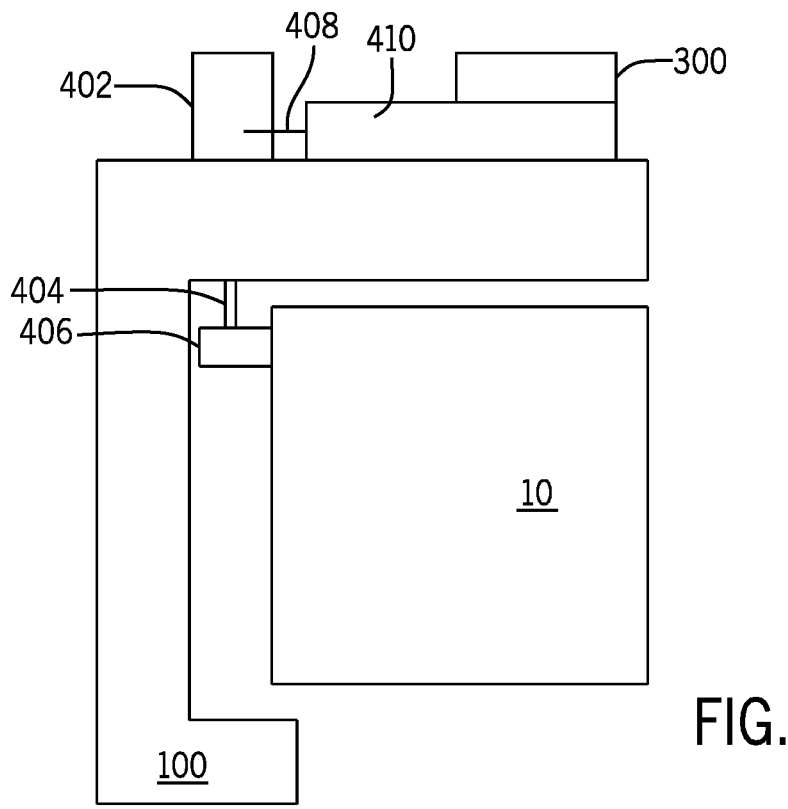
FIG. 16 is a block diagram representation of one embodiment of the mover illustrated in FIG. 15.

With reference to FIG. 14, the motor drive 200 may be configured to receive an AC voltage from the secondary winding 182 at an input 202 of the motor drive. The AC voltage is, in turn, provided to a rectifier section 204 of the motor drive 200. The rectifier section 204 may include any electronic device suitable for passive or active rectification as is understood in the art. According to the illustrated embodiment, the rectifier section 204 includes a set of diodes 206 forming a diode bridge that rectifies the three-phase AC voltage to a DC voltage on the DC bus 208. Optionally, the rectifier section 204 may include other solid-state devices including, but not limited to, thyristors, silicon controlled rectifiers (SCRs), or transistors to convert the input voltage to a DC voltage for the DC bus 208. The DC voltage is present between a positive rail 210 and a negative rail 212 of the DC bus 208. A DC bus capacitor 214 is connected between the positive and negative rails, 210 and 212, to reduce the magnitude of the ripple voltage resulting from converting the AC voltage to a DC voltage. It is understood that the DC bus capacitor 214 may be a single capacitor or multiple capacitors connected in parallel, in series, or a combination thereof. The magnitude of the DC voltage between the positive and negative rails, 210 and 212, is generally equal to the magnitude of the peak of the AC input voltage.

Optionally, the AC voltage may be supplied to the input of the motor drive 200 from the generator 402. When the mover 100 is travelling, the generator 402 may be configured to generate sufficient energy to propel the mover along the track. In addition, a portion of the energy produced by the generator 402 may be stored in the energy storage device 418. It is contemplated that the power converter 410 shown in FIG. 17 may be a separate power converter from the motor drive 200 or incorporated with the motor drive 200. The AC voltage output from the generator 402, for example may be supplied to a common DC bus, where the common DC bus acts as the DC bus in both the motor drive 200 and the power converter 410. Further, the energy storage device 418 may be connected directly to the shared DC bus as well with the regulator 415 connected between the shared DC bus and the energy storage device 418. The level of charge on the energy storage device is preferably maintained at a sufficient level to supply power to the motor drive 200 to start motion of the mover 100. Subs According to still another embodiment, the motor drive 200 may be powered directly from the DC bus 526 of the power converter 520 configured to receive power from the optical source 505. It is contemplated that the power converter 520 discussed above with respect to the optical source 505 may be combined with or replace the motor drive 200. The power supplied by the optical source 505 may be utilized directly to energize motor coils 250. Optionally, a common DC bus may be utilized by both the motor drive 200 and the power converter 520, where the inverter section 220 of the motor drive 200 supplies power to the drive coils 250 and the inverter section 534 of the power converter 520 supplies power to AC electronic devices 300 mounted to the mover 100.

The DC bus 208 is connected in series between the rectifier section 204 and an inverter section 220. The inverter section 220 consists of a number of switches 222. Each switch 222 is preferably a solid-state switching element, such as a transistor, thyristor, or SCR as is known in the art. The switching element may also include a free-wheeling diode connected across the switching element. Each of the switches 222 receives a switching signal, sometimes referred to as a gating signal, 224 to selectively enable the switch 222 and to convert the DC voltage from the DC bus 208 into a controlled AC voltage at an output 226 of the inverter section 220. When enabled, each switch 222 connects the respective rail 210, 212 of the DC bus 208 to an output terminal. The drive coils 250 are connected to the output 226 of the inverter section to receive the controlled AC voltage to establish an electromagnetic field to interact with the drive magnets 255 and control motion of the corresponding mover 100.

One or more modules are used to control operation of the motor drive 200. The modules may be stored programs executed on one or more processors, logic circuits, or a combination thereof. According to the illustrated embodiment, the motor drive 200 includes a controller 230 and a memory device 232 in communication with the controller 230. The controller 230 may be implemented, for example, in a microprocessor, application specific integrated circuit (ASIC), field programmable gate array (FPGA), or other such customizable device. The memory device 232 may include transitory memory, non-transitory memory or a combination thereof. The memory device 232 may be configured to store data and programs, which include a series of instructions executable by the controller 230. It is contemplated that the memory device 232 may be a single device, multiple devices, or incorporated, for example, as a portion of another device such as an application specific integrated circuit (ASIC). The controller 230 is in communication with the memory 232 to read the instructions and data as required to control operation of the motor drive 200.

The motor drive 200 also receives feedback signals indicating the current operation of the motor drive 200. The motor drive 200 may include a voltage sensor 236 and/or a current sensor 238 on the DC bus 208 generating a feedback signal corresponding to the magnitude of voltage and/or current present on the DC bus 208. The motor drive 200 may also include a voltage sensor 240 and/or a current sensor 242 generating a feedback signal corresponding to the magnitude of voltage and/or current present at the output 226 of the inverter section 220. The controller 230 utilizes the feedback signals to generate the switching signals 224 to control operation of the inverter section 220 and to generate a desired output voltage for each drive coil 250 present on the mover 100.

It is further contemplated that a mover 100 with a motor drive 200 may also include one or more electronic devices mounted to the mover 100. As illustrated, a load 300 is powered by a power converter 260, separate from the motor drive 200, also mounted to the mover 100. The illustrated power converter 260 includes only a switching section 270 as described above with respect to FIG. 10. The DC bus of the power converter 260 illustrated in FIG. 14 is connected directly to the DC bus 208 of the motor drive 200. Optionally, the power converter 260 may include an input receiving power from the source in parallel with the motor drive 200.

In operation, a power source provides power to each mover 100 travelling along the track 10 without requiring a fixed connection to the mover 100. According to one embodiment of the invention, the sliding transformer wirelessly provides power from the track 10 to each mover 100 travelling along the track 10. According to the embodiment illustrated in FIG. 10, a utility power supply 171 is connected to the primary winding 172. The utility power supply 171 provides power at a fixed voltage and frequency and the power converter 260 on each mover 100 regulates power drawn from the secondary winding 182. Optionally, a power converter 350 may be connected between a utility power supply and the primary winding 172, as shown in FIG. 9. The power converter 350 may be controlled to provide a voltage to the primary winding 172 with a variable voltage and/or a variable frequency. If the primary winding 172 spans multiple track segments, a single connection to the power supply is provided for each primary winding and suitable connectors are provided between segments to join the forward and reverse conduction paths. If a separate primary winding 172 is provided for each track segment 12, a separate power converter 350 may be provided on each track segment to convert power from an input power source to a modulated voltage for the primary winding 172.

At a fixed voltage level, for example, 110 VAC, the frequency of the voltage applied to the primary winding 172 impacts the amount of power transferred between the primary and secondary windings and also impacts the level of voltage ripple present at the secondary winding. With a utility power supply 171, voltage is provided, for example, at 110 VAC and 60 Hz. With a power converter 350 supplying power to the primary winding 172, the output may be modulated to provide voltage at a higher frequency, ranging, for example, from 60-2000 Hz. According to one embodiment of the invention, the voltage is provided with a frequency in a range of 250-1000 Hz.

Increasing the frequency of the voltage supplied to the primary winding, impacts voltage coupling between the primary winding 172 and the secondary winding 182. As the frequency of the voltage increases, the ripple on the voltage present on the secondary winding 182 decreases. As a result, the capacitance value for the DC bus capacitor 266 present on the mover 100 can be decreased. However, as the frequency increases, the amplitude of the voltage present on the secondary winding decreases and, therefore, the total power transferred similarly decreases. A comparison of the voltages and power present on the secondary winding of an exemplary sliding transformer is presented in Table 1 below. The amplitude of input voltage is constant at 110 VAC and the number of turns on the secondary winding is constant at sixty turns.

TABLE 1

Evaluation of different frequencies of voltage provided to a primary winding with a secondary winding having 60 turns

| Frequency | 60 Hz | 250 Hz | 1000 Hz |
|---|---|---|---|
| $V_{avg}$ (V) | 80 | 79 | 62 |
| $V_{ripple}$ ($V_{pk-pk}$) | 30 | 6 | 1 |
| $P_{avg}$ (W) | 713 | 629 | 386 |

The power transferred between the primary winding 172 and the secondary winding 182 is further influenced by the number of turns present in the secondary winding. According to one embodiment of the invention, the number of turns present in the primary winding matches the number of turns present in the secondary winding to provide a 1:1 turns ratio. It is contemplated that various other turns ratios may be utilized without deviating from the scope of the invention. As the number of turns in the secondary winding 182 increases, the voltage level on the secondary winding decreases. However, as the number of turns in the secondary winding 182 increases, the magnitude of voltage ripple also decreases. Thus, to increase the power transferred between the primary and secondary windings, it is preferable to have a lower number of turns on the secondary winding. A comparison of the voltages and power present on the secondary winding of an exemplary sliding transformer as a result of different numbers of turns on the secondary winding is presented in Table 2 below. The amplitude of input voltage is constant at 110 VAC and the frequency of the input voltage is constant at sixty Hertz.

TABLE 2

Evaluation of different numbers of turns on a secondary winding with a constant frequency supplied to a primary winding

| Secondary Turns | 60 | 40 | 20 |
|---|---|---|---|
| $V_{avg}$ (V) | 80 | 81 | 82 |
| $V_{ripple}$ ($V_{pk-pk}$) | 30 | 37 | 38 |
| $P_{avg}$ (W) | 713 | 705 | 745 |

In addition, the present inventors have identified that the effect of increasing the frequency of the voltage supplied to the primary winding 172 has less impact on the voltage drop when the number of turns of the secondary winding 182 is decreased. For example, when the number of turns on the secondary winding is twenty turns, the average voltage remains about constant as the frequency of the voltage supplied to the primary winding increases. In fact, the average voltage increases slightly as the voltage ripple decreases providing an improved voltage on the secondary winding. A comparison of the voltages and power present on the secondary winding of another exemplary sliding transformer is presented in Table 3 below. The amplitude of input voltage is constant at 110 VAC and the number of turns on the secondary winding is constant at twenty turns.

TABLE 3

Evaluation of different frequencies of voltage provided to a primary winding with a secondary winding having 20 turns

| Frequency | 60 Hz | 1000 Hz |
|---|---|---|
| $V_{avg}$ (V) | 82 | 88 |
| $V_{ripple}$ ($V_{pk-pk}$) | 38 | 2 |
| $P_{avg}$ (W) | 745 | 770 |

According to one embodiment of the invention, each of the primary and secondary windings have the same number of turns and, therefore, have a 1:1 turns ratio. The primary winding 172 includes a first coil extending along the length of each track segment 12 and each mover 100 includes a secondary winding 182 having eighty or fewer turns and, preferably, between twenty and sixty turns. The primary winding is connected to a utility supply and, therefore, receives a fixed sixty hertz input voltage. Connecting the primary winding directly to the utility supply provides a reduced system cost by not requiring a power converter to supply a variable frequency voltage to each primary winding.

In alternate embodiments, however, it is contemplated that a power converter 350 is provided to supply a variable frequency voltage to the primary winding 172. When a power converter is provided to supply voltage to the primary winding 172, the frequency of the voltage may be supplied at 200 Hz or greater and, preferably at 1000 Hz or greater. It is further contemplated that the turns ratio between the primary and secondary windings may be varied.

It is further contemplated that the mover 100 may include an energy storage device to supplement operation of the motor drive 200 or power converter 260. During, for example, periods of short term power loss, the energy storage device may allow the motor drive 200 or power converter 260 to continue operation. The energy storage device may be the DC bus capacitor 214, 366 present in the motor drive 200 or power converter 260, respectively. The DC bus capacitor may be sized, for example, to include sufficient power to allow a mover 100 to traverse a gap between primary windings 172. Such a gap may exist between track segments 12 if separate primary windings 172 are provided on each segment. Optionally, the energy storage device may include a larger capacity and may be, for example, a super capacitor or a battery, where the energy storage device may provide sufficient energy, for example, such that the mover 100 may traverse one or more track segments that do not include a primary winding. Thus, the mover 100 may receive power during one segment of the track and utilize the stored power along another segment of the track.

According to another embodiment of the invention, an optical transmitter 505 wirelessly provides power from the track 10 to each mover 100 travelling along the track 10. According to the embodiment illustrated in FIG. 22, a utility power supply 171 is connected to the optical transmitter 505. The optical transmitter 505 may include the rectifier circuit 500 and drive circuit 502 to convert the AC voltage from the utility power supply 171 to a desired DC voltage to power the laser diodes 504 in the transmitter 505. One or more optical devices, such as filters and/or lenses may be mounted between the laser diode 504 and an opening 506 in the housing 503 through which the light 508 is emitted. The filters and/or lenses may remove unwanted components and orient or focus the light beams emitted from the laser diodes 504 prior to transmission. Although illustrated and discussed herein with respect to laser diodes 504, it is contemplated that various other types of lasers may be mounted to the track 10 and emit light for transferring power to the movers 100. The laser may be, but are not limited to, a gas laser, a solid-state laser, or a chemical laser.

The laser is selected such that a sufficient amount of power may be transmitted via the optical beam to each mover 100 according to the application requirements. An electronic actuator, for example, may energize intermittently and require only a few watts to tens of watts of power to activate. The light emitted 508 may only be required to transfer a corresponding level of power to the mover 100. Further, if an energy storage device 518 is provided on the mover 100, the light 508 may transmit a fraction of the required power on a continuous basis. When the actuator is not energized, the energy transmitted from the laser is stored in the energy storage device 518. When the actuator is energized, the stored energy is delivered to the actuator to supplement the energy transmitted by the laser. Thus, the level of energy transmitted by the laser must only be sufficient to charge the energy storage device 518 between the intermittent activation of the actuator. In another embodiment, the drive coils 250 may be mounted to the mover 100 and sufficient power must be supplied to the mover 100 to energize the drive coils 250 to control travel of the mover 100 along the track 10. It may be desirable to supply hundreds of watts or up to one kilowatt of power to the mover 100 to supply sufficient power to energize the drive coils 250.

An optical receiver 510 is mounted to each mover 100 to receive the light 508 beam from the transmitter 505 as the mover 100 travels along the track 10. The receiver is any device that converts light energy into electrical energy. According to the illustrated embodiment, the receiver 510 includes one or more photovoltaic modules and may form a photovoltaic array. As illustrated in FIG. 19, the optical transmitter 505 may be offset from the receiver 510 such that the receiver 510 does not mechanically interfere with the transmitter 505 as the mover 100 passes the transmitter 505. The opening 506 in the housing 503 may be directed toward the receiver 510 such that the light 508 is emitted across the gap separating the transmitter 505 and the receiver 510. As the mover 100 travels along the track, the distance between the transmitter 505 and receiver 510 will change and, therefore, the location on the receiver at which the light 508 is incident will change. When the mover 100 is distant from the transmitter 505, the light 508 will fall on the portion of the mover 100 furthest from the track 10, and when the mover 100 is proximate the transmitter 505, the light 508 will fall on the portion of the mover 100 closest to the track 10. Thus, the optical receiver 510 may extend along the width of the bottom member 106 of the mover 100 to provide the longest distance over which the receiver will receive the light 508. The optical transmitter 505 and receiver 510 are preferably configured to allow the emitted light 508 to fall on the receiver 510 over the length of at least one track segment 12. Thus, a separate transmitter 505 may be provided on each track segment 12 to provide power to each mover 100 traveling along the track segment 12.

In the motion control system, multiple movers 100 may travel along a track segment 12. In the illustrated embodiment, a first mover 100 located in front of a second mover 100 may cause interference between the optical transmitter 505 and the receiver 510 on the second mover 100. Therefore, multiple transmitters 505 may be mounted on the track segment 12 to provide power to each mover 100 present on the segment 12. The mounting fixture 501 may extend downward for a further distance and multiple transmitters 505 may be located one below the other along the mounting fixture 501. The receivers 510 may similarly be offset below each other on successive movers 100 such that each transmitter 505 may emit light 508 to a different receiver 510. The number of transmitters and locations of receivers 510 correspond to a maximum number of movers 100 supported by a track segment 12.

As previously indicated, the mover 100 may include an energy storage device to supplement operation of the motor drive 200 or power converter 520. During, for example, periods of short term power loss, the energy storage device may allow the motor drive 200 or power converter 520 to continue operation. The energy storage device may be the DC bus capacitor 214, 532 present in the motor drive 200 or power converter 520, respectively. The DC bus capacitor may be sized, for example, to include sufficient power to allow a mover 100 to traverse a gap between track segments 12 during which no light 508 is incident on the optical receiver 510. Optionally, the energy storage device may include a larger capacity and may be, for example, a super capacitor or a battery, where the energy storage device may provide sufficient energy, for example, such that the mover 100 may traverse one or more track segments that do not include an optical transmitter 505. Thus, the mover 100 may receive power along one segment of the track and utilize the stored power along another segment of the track.

According to another embodiment of the invention, a generator 402 provides power the mover 100 while traveling along the track 10. According to the embodiment illustrated in FIGS. 15-18, a drive wheel 406 is mounted to the mover 100 such that it engages a portion of the track 10 as the mover 100 travels along the track 10. A drive shaft 404 extends between the drive wheel 406 and the generator 402. The drive shaft 404 causes a rotor within the generator to turn. Permanent magnets mounted to the rotor generate a magnetic field which, in turn, induces a current and voltage in the stator of the generator 402, thereby generating electric power due to rotation of the drive wheel 406. As discussed above, the electric power is provided to a power converter 410 for use by electrical devices 300 or by a motor drive 200 mounted on the mover 100.

Each generator 402 is configured to generate electrical power as the mover 100 travels. The amount of power is determined by the construction of the generator 402, the speed of travel of the mover 100 and by the amount of travel performed by the mover 100. The generator 402 may be selected such that a sufficient amount of power is generated on mover 100 to power one or more electronic devices 300 mounted to the mover 100. An electronic actuator, for example, may energize intermittently and require only a few watts to tens of watts of power to activate. The generator 402 may only be required to output a corresponding level of power to the mover 100. If the mover 100 is travelling during actuation, the generator 402 may supply power directly to the electronic device 300. If actuation is required when the mover 100 is stopped, an energy storage device 418 may be provided on the mover 100. The energy storage device 418 receives power output from the generator 402 while the mover 100 is moving. When the actuator is energized, the stored energy is delivered to the actuator. Thus, the level of energy output from the generator 402 must only be sufficient to charge the energy storage device 418 between the intermittent activation of the actuator. In another embodiment, the drive coils 250 may be mounted to the mover 100 and sufficient power must be supplied to the mover 100 to energize the drive coils 250 to control travel of the mover 100 along the track 10. It may be desirable to supply hundreds of watts or up to one kilowatt of power to the mover 100 to supply sufficient power to energize the drive coils 250. Initially sufficient energy must be stored in the energy storage device 418 to get the mover 100 started. Once the mover 100 is travelling, the power output from the generator is provided to the motor drive 200 for subsequent energization of the drive coils 250.

It is contemplated that the generator 402 may be used in combination with either the sliding transformer or the optical transmitter 505 to supply power to the mover 100. A portion of the electrical power required by the mover 100 may be output from the generator 402 and a portion of the electrical power may be transmitted to the mover via either the sliding transformer or the optical transmitter. Further, while separate power converters are illustrated, it is contemplated that portions of the power converters may be combined to reduce the number of components present on the mover 100. For example, a common dc bus may be used with a generator, sliding transformer, motor drive, and an electronic device present on the mover 100. The AC power supplied from either the generator or the sliding transformer may be provided via respective rectifier sections to the dc bus and the motor drive and the electronic device may receive power from the dc bus via respective inverter sections.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An apparatus for providing power to a mover in an independent moving cart control system, the apparatus comprising:
   at least one mover, wherein the at least one mover includes at least one drive magnet mounted to the at least one mover;
   a track having a length and defining a path along which the at least one mover travels:
   a plurality of drive coils positioned along the length of the track, wherein the plurality of drive coils are controlled to generate an electromagnetic field to interact with the at least one drive magnet mounted on the at least one mover to control operation of the at least one mover;
   at least one electrical device, wherein the at least one electrical device is mounted to the at least one mover;
   a primary winding associated with the track, wherein the primary winding is configured to receive power from a power supply;
   a secondary winding associated with the at least one mover that is positioned proximate the primary winding as the at least one mover travels along the track, wherein an air gap separates the secondary winding from the primary winding, and power from the power supply is inductively transferred from the primary winding to the secondary winding across the air gap; and
   a power converter associated with the at least one mover that is operative to receive power from the secondary winding and to supply power to the at least one electrical device mounted on the mover.

2. The apparatus of claim 1 wherein the track includes a plurality of track segments.

3. The apparatus of claim 2 wherein the primary winding includes a plurality of windings and at least one of the plurality of windings for the primary winding is mounted to each of the plurality of track segments.

4. The apparatus of claim 2 wherein:
   the primary winding includes a plurality of windings,
   a first portion of the plurality of track segments includes at least one of the plurality of windings for the primary winding mounted to each of the plurality of track segments in the first portion, and
   a second portion of the plurality of track segments has none of the plurality of windings mounted on the plurality of track segments in the second portion.

5. The apparatus of claim 4 further comprising an electrical energy storage device mounted on the at least one mover, wherein:
   at least a portion of the power received from the secondary winding is stored in the electrical energy storage device when the at least one mover is located on the first portion of the plurality of track segments, and
   the portion of power stored in the electrical energy storage device when the at least one mover is located on the first portion of the plurality of track segments is supplied to the at least one electrical device mounted on the at least one mover when the at least one mover is located on the second portion of the plurality of track segments.

6. The apparatus of claim 1 further comprising a supply-side power converter, wherein the supply-side power converter is configured to receive power from the power supply and to provide power to the primary winding.

7. The apparatus of claim 6 wherein the supply-side power converter is configured to provide an alternating current power to the primary winding, wherein a frequency of the alternating current power is at least 100 Hz.

8. A linear motor system comprising:
   a track having a length and defining a path;
   a mover configured to move along the path, wherein the mover includes at least one drive magnet mounted to the mover;
   a plurality of drive coils positioned along the length of the track, wherein the plurality of drive coils are controlled to generate an electromagnetic field to interact with the at least one drive magnet mounted on the mover to control operation of the mover;
   a primary winding associated with the track that receives power from a power supply;
   a secondary winding associated with the mover that is positioned proximate the primary winding to define an air gap between the primary winding and the secondary winding;
   an electrical device associated with the mover; and
   a power converter connected between the electrical device and the secondary winding, wherein power from the power supply is inductively coupled from the primary winding to the secondary winding and the power converter supplies power from the secondary winding to the electrical device.

9. The apparatus of claim 8 further comprising a supply-side power converter, wherein the supply-side power converter is configured to receive power from the power supply and to provide power to the primary winding.

10. The apparatus of claim 9 wherein the supply-side power converter is configured to provide an alternating current power to the primary winding, wherein a frequency of the alternating current power is at least 100 Hz.

11. The apparatus of claim 9 wherein the track includes a plurality of track segments.

12. The apparatus of claim 11 wherein the primary winding includes a plurality of windings and at least one of the plurality of windings for the primary winding is mounted to each of the plurality of track segments.

13. The apparatus of claim 11 wherein:
   the primary winding includes a plurality of windings,
   a first portion of the plurality of track segments includes at least one of the plurality of windings for the primary winding mounted to each of the plurality of track segments in the first portion, and
   a second portion of the track segments has none of the plurality of windings mounted on the plurality of track segments in the second portion.

14. The apparatus of claim 13 further comprising an electrical energy storage device mounted on the mover, wherein:
   at least a portion of the power received from the secondary winding is stored in the electrical energy storage device when the mover is located on the first portion of the plurality of track segments, and
   the portion of power stored in the electrical energy storage device when the mover is located on the first portion of the plurality of track segments is supplied to the at least one electrical device mounted on the mover when the mover is located on the second portion of the plurality of track segments.

15. A method of powering an electrical device associated with a mover in a linear motor system, comprising:
controlling operation of the mover by generating an electromagnetic field with a plurality of drive coils positioned along a track of the linear motor system, wherein the electromagnetic field interacts with at least one drive magnet mounted to the mover;
supplying power to a primary winding for the track in the linear motor system;
receiving inductively coupled power with a secondary winding associated with the mover, wherein the secondary winding is positioned proximate the primary winding as the mover travels along the track; and
coupling power received by the secondary winding to the electrical device through a power converter mounted on the mover.

16. The method of claim 15 wherein the step of supplying power to the primary winding for the track further comprises the steps of:
supplying power to an input of a supply-side power converter; and
generating power at an output of the supply-side power converter, wherein the power generated at the output of the supply-side power converter is supplied to the primary winding.

17. The method of claim 16 wherein the supply-side power converter is configured to provide an alternating current power to the primary winding, wherein a frequency of the alternating current power is at least 100 Hz.

18. The method of claim 15 wherein:
the mover includes an electrical energy storage device,
the track includes a plurality of track segments,
the primary winding includes a plurality of windings,
a first portion of the plurality of track segments includes at least one of the plurality of windings for the primary winding mounted to each of the plurality of track segments in the first portion,
a second portion of the plurality of track segments has none of the plurality of windings mounted on the plurality of track segments in the second portion, the method further comprising the steps of:
storing at least a portion of the power received from the secondary winding in the electrical energy storage device when the mover is located on the first portion of the plurality of track segments, and
supplying the portion of power stored in the electrical energy storage device when the mover is located on the first portion of the plurality of track segments to the at least one electrical device mounted on the mover when the mover is located on the second portion of the plurality of track segments.

* * * * *